(12) United States Patent
Sullivan et al.

(10) Patent No.: US 6,743,847 B1
(45) Date of Patent: *Jun. 1, 2004

(54) GOLF BALL COVER COMPOSITIONS

(75) Inventors: Michael J. Sullivan, Barrington, RI (US); Robert A. Weiss, Mansfield Center, CT (US); Michelle A. Bellinger, West Hartford, CT (US)

(73) Assignee: Callaway Golf Company, Carlsbad, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 958 days.

(21) Appl. No.: 08/681,870

(22) Filed: Jul. 29, 1996

Related U.S. Application Data

(63) Continuation-in-part of application No. 08/551,254, filed on Oct. 31, 1995, now Pat. No. 5,591,803, which is a continuation of application No. 08/359,620, filed on Dec. 20, 1994, now Pat. No. 5,542,677.

(51) Int. Cl.[7] .................................................. C08J 3/00
(52) U.S. Cl. ........................................ 524/522; 525/196
(58) Field of Search ........................... 525/196; 524/522

(56) References Cited

U.S. PATENT DOCUMENTS

| | | | |
|---|---|---|---|
| 3,823,108 A | * | 7/1974 | Bisset |
| 4,431,193 A | | 2/1984 | Nesbitt |
| 4,679,795 A | | 7/1987 | Melvin et al. |
| 4,848,770 A | | 7/1989 | Shama |
| 4,884,814 A | | 12/1989 | Sullivan |
| 4,911,451 A | * | 3/1990 | Sullivan et al. |
| 5,218,057 A | | 6/1993 | Kurkov et al. |
| 5,397,840 A | * | 3/1995 | Sullivan et al. |
| 5,492,971 A | * | 2/1996 | Williams ............... 525/196 |
| 5,492,972 A | * | 2/1996 | Stefani ................. 525/196 |
| 5,508,351 A | * | 4/1996 | Horiuchi et al. ........ 525/196 |
| 5,516,847 A | * | 5/1996 | Sullivan et al. |
| 5,542,677 A | * | 8/1996 | Sullivan et al. |

FOREIGN PATENT DOCUMENTS

JP            598742    * 1/1984 .................. 525/196

OTHER PUBLICATIONS

Hackh's Chemical Dictionary—May 27, 1991 p. 334.*

* cited by examiner

*Primary Examiner*—Bernard Lipman

(57) ABSTRACT

The present invention is directed to golf ball cover compositions containing metal cation neutralized carboxylic acid based copolymers and/or alkali metal cation neutralized ethylene copolymers such as ethylene alkyl acrylates. Golf balls produced with the cover molded thereon exhibit desired properties of distance and high coefficient of restitution without substantially sacrificing and/or improving characteristics like playability and durability when compared to existing ionomeric resin covers.

1 Claim, No Drawings

GOLF BALL COVER COMPOSITIONS

This is a continuation-in-part of U.S. application Ser. No. 08/551,254 filed on Oct. 31, 1995 and issued on Jan. 7, 1997 as U.S. Pat. No. 5,591,803 which is in turn a continuation of U.S. application Ser. No. 08/359,620 filed on Dec. 20, 1994 and issued on Aug. 8, 1996 as U.S. Pat. No. 5,542,677.

FIELD OF THE INVENTION

The present invention relates to blends of one or more metal cation neutralized acid copolymers with one or more metal cation neutralized ethylene acrylates, and to improved golf ball covers made from these blends. More particularly, the invention relates to golf ball covers produced from blends of at least one metal cation neutralized olefin-carboxylic acid copolymer, such as ethylene acrylic or methacrylic acid copolymer, and at least one metal cation (preferably alkali metal cation) hydrolyzed and neutralized ethylene alkyl acrylate copolymer. The improved golf ball covers are useful for producing golf balls exhibiting the desired travel distance while maintaining or improving the playability and/or durability characteristics necessary for repetitive play.

BACKGROUND OF THE INVENTION

Ionomeric resins are polymers containing interchain ionic bonding. As a result of their toughness, durability, and flight characteristics, various ionomeric resins sold by E.I. DuPont de Nemours & Company under the trademark "Surlyn®" and more recently, by the Exxon Corporation under the trademarks "Escor®" and the tradename "Iotek™", have become the materials of choice for the construction of golf ball covers over the traditional "balata" (trans polyisoprene, natural or synthetic) rubbers. The softer balata covers, although exhibiting enhanced playability properties, lack the durability properties required for repetitive play.

Ionomeric resins are generally ionic copolymers of an olefin, such as ethylene, and a metal salt of an unsaturated carboxylic acid, such as acrylic acid, methacrylic acid or maleic acid. In some instances, an additional softening comonomer can also be included to form a terpolymer. The pendent ionic groups in the ionomeric resins interact to form ion-rich aggregates contained in a non-polar polymer matrix. The metal ions, such as sodium, zinc, magnesium, lithium, potassium, calcium, etc. are used to neutralize some portion of the acid groups in the copolymer resulting in a thermoplastic elastomer exhibiting enhanced properties, i.e. improved durability, etc. for golf ball construction over balata.

Broadly, the ionic copolymers comprise one or more alpha-olefins and from about 9 to about 30 weight percent of alpha, beta-ethylenically unsaturated mono- or dicarboxylic acid, the basic copolymer neutralized with metal ions to the extent desired. Usually, at least 20% of the carboxylic acid groups of the copolymer are neutralized by the metal ions (such as sodium, potassium, manganese, zinc, lithium, calcium, nickel, magnesium, and the like) and exist in the ionic state. In general, ionic copolymers including up to 16% acid are considered "low acid" ionomers, while those including greater than 16% acid are considered "high acid" ionomers by the present inventors.

Suitable olefins for use in preparing the ionomeric resins include ethylene, propylene, butene-1, hexene-1, and the like. Unsaturated carboxylic acids include acrylic, methacrylic, ethacrylic, α-chloroacrylic, crotonic, maleic, fumaric, itaconic acids, and the like. The ionomeric resins utilized in the golf ball industry are generally copolymers of ethylene with acrylic (i.e. Escor® or Iotek™) and/or methacrylic (i.e. Surlyn®) acid. In addition, two or more types of ionomeric resins may be blended into the cover compositions in order to produce the desired properties of the resulting golf balls.

Along this line, the properties of the cover compositions and/or the ionomeric resins utilized in the golf ball industry vary according to the type and amount of the metal cation, the molecular weight, the composition of the base resin (i.e. the nature and the relative content of the olefin, the unsaturated carboxylic acid groups, etc.), the amount of acid, the degree of neutralization and whether additional ingredients such as reinforcement agents or additives are utilized. Consequently, the properties of the ionomer resins can be controlled and varied in order to produce golf balls having different playing characteristics, such as differences in hardness, playability (i.e. spin, feel, click, etc.), durability (i.e. impact and/or cut resistance), and resilience (i.e. coefficient of restitution).

However, while there are currently more than fifty commercial grades of ionomers available from DuPont and Exxon with a wide range of properties which vary according to the type and amount of metal cations, molecular weight, composition of the base resin (i.e. relative content of ethylene and methacrylic and/or acrylic acid groups), the degree of neutralization and additive ingredients such as reinforcement agents, etc., a great deal of research continues in order to develop golf ball cover compositions exhibiting not only the playability characteristics previously associated with the balata cover, but also the improved impact resistance and carrying distance properties produced by the ionomeric resins. Thus, an object of the present invention is to provide golf ball cover compositions which, when utilized in golf ball construction, produce balls exhibiting the desired travel distance (i.e., similar coefficient of restitution values) while maintaining or improvity satisfactory playability and durability properties.

A golf ball's coefficient of restitution, (C.O.R.) is the ratio of the relative velocity of the ball after direct impact to that before impact. One way to measure the coefficient of restitution is to propel a ball at a given speed against a hard massive surface, and measure its incoming velocity and outgoing velocity. The coefficient of restitution is defined as the ratio of the outgoing velocity to incoming velocity of a rebounding ball and is expressed as a decimal. As a result, the coefficient of restitution can vary from zero to one, with one being equivalent to an elastic collision and zero being equivalent to an inelastic collision.

The coefficient of restitution of a one-piece golf ball is a function of the ball's composition. In a two-piece or a multi-layered golf ball, the coefficient of restitution is a function of the core, the cover and any additional layer. While there are no United States Golf Association (U.S.G.A.) limitations on the coefficient of restitution values of a golf ball, the U.S.G.A. requires that the golf ball cannot exceed an initial velocity of 255 feet/second. As a result, golf ball manufacturers generally seek to maximize the coefficient of restitution of a ball without violating the velocity limitation.

In various attempts to produce a high coefficient of restitution golf ball exhibiting the enhanced travel distance desired, the golfing industry has blended various ionomeric resins. However, many of these blends do not exhibit the durability and playability characteristics necessary for repetitive play and/or the enhanced travel distance desired.

It is, therefore, desirable to develop cover compositions which produce golf balls exhibiting properties of desired carrying distance (i.e., possess desirable coefficient of restitution values) such as the ionomeric cover blends set forth in U.S. Pat. Nos. 4,884,814 and 4,911,451, without sacrificing or improving playability and/or durability characteristics.

Furthermore, while as stated above, Surlyn® and Escor® (or "Iotek™") are materials of choice for golf ball cover construction when balata (natural or synthetic) is not used, these materials are relatively costly and available from limited sources. It has, therefore, become desirable to develop alternative ionomer resin based compositions having properties suitable for use to in golf ball cover construction.

These and other objects and features of the invention will be apparent from the following description and from the claims.

SUMMARY OF THE INVENTION

The present invention is directed to golf ball covers, and more specifically to golf ball cover compositions which comprise blends of one or more metal cation neutralized olefin-carboxylic acid copolymers, such as ethylene acrylic or methacrylic acid copolymers, and one or more metal cation (preferably alkali metal cation) neutralized ethylene alkyl acrylate copolymers. The golf ball covers of the invention provide desirable alternatives to covers produced from the Surlyn® and Iotek™ ionomeric resins currently used in golf ball cover construction.

The present invention is particularly directed to golf ball cover compositions which are prepared by blending at least one metal cation neutralized acid copolymer which contains about 1% to about 30% carboxylic acid, with at least one alkali metal cation hydrolyzed and neutralized ethylene alkyl acrylate copolymers containing up to about 30% by weight of an alkyl acrylate. The alkyl acrylate in the ethylene copolymer is any acrylic or methacrylic esters of linear, branched or cyclic alkanols having 1–28 carbon atoms including, among others, ethyl acrylate, methyl acrylate and butyl acrylate. The ethylene copolymers may, therefore, comprise ethylene ethyl acrylate (EEA), ethylene methyl acrylate (EMA), and/or ethylene butyl acrylate (EBA) among others.

The selection of type and ratio of the metal cation neutralized acid copolymer, such as ethylene acrylic acid copolymer, ethylene methacrylic acid copolymer, etc., to the alkali metal cation neutralized ethylene alkyl acrylate copolymer (i.e., EEA, EMA, EBA, etc.) is based on the desired final hardness, durability, travel distance and spin rate of the ball. Preferably, the blend of the metal cation neutralized acid copolymer and the alkali metal cation neutralized ethylene alkyl acrylate includes about 0 to 90 parts by weight acid copolymer, and about 100 to 10 parts by weight ethylene alkyl acrylate. More preferably, the blend is comprised of about 0 to 75 parts by weight partially neutralized acid copolymer and about 100 to 25 parts by weight hydrolyzed and neutralized ethylene alkyl acrylate. Most preferably the blend consists of about 0 to about 50 parts by weight neutralized acid copolymer and about 100 to 50 parts by weight neutralized and hydrolyzed ethylene alkyl acrylate.

In another aspect, the invention relates to a cover composition comprising a blend of i) a metal cation neutralized copolymer of about 1 weight percent to about 30 weight percent, preferably 9 to 25 weight percent of an alpha, beta-unsaturated carboxylic acid (preferably acrylic acid or methacrylic acid) and an olefin (preferably ethylene), and ii) an metal cation (preferably alkali metal cation) neutralized ethylene alkyl acrylate (preferably ethylene methyl acrylate and ethylene butyl acrylate). Approximately, 10% to about 90% of the carboxyl groups of the acid copolymer are neutralized with a metal cation such as a metal cation selected from the group consisting of manganese, lithium, potassium, calcium, manganese, zinc, sodium, and nickel. In addition, the carboxylic acid esters of the ethylene alkyl acrylate copolymers are hydrolysized or neutralized though the use of alkali metal cations.

In another further aspect, the invention relates to a golf ball comprising a core and a cover, wherein the cover is comprised of a blend of i) a metal cation neutralized copolymer of about 1 to 30% by weight of an acrylic acid and the remainder ethylene and ii) an alkali metal cation neutralized ethylene alkyl acrylate. Approximately, 10% to 90% of the carboxyl groups of the acrylic acid/ethylene copolymer are neutralized with a metal cation such as a metal cation selected from the group consisting of manganese, lithium, potassium, sodium, zinc, magnesium, calcium and nickel. Moreover, the carboxylic acid esters of the ethylene alkyl acrylate copolymer are hydrolysized and neutralized by an alkali metal cations such as lithium, sodium and potassium. In addition, the cover may contain one or more additional ingredients such as pigments, dyes, U.V. absorbers and optical brighteners. The core is generally a solid core.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art.

DETAILED DESCRIPTION OF THE INVENTION

The present invention relates to the development of golf balls, and more particularly to golf ball cover compositions which comprise blends of one or more acid copolymers with one or more hydrolyzed and neutralized neutralized ethylene copolymers (i.e., ethylene alkyl acrylates). Golf ball covers having good durability, playability (spin) and C.O.R. characteristics are provided.

The acid copolymer used herein may contain anywhere from 1 to 30 percent by weight acid. In some instances, it is preferable to utilize a high acid copolymer (i.e. a copolymer containing greater than 16% by weight acid, preferably from about 17 to about 25 weight percent acid, and more preferably about 20 weight percent acid). The acid copolymer is neutralized with a metal cation salt capable of ionizing or neutralizing the copolymer to the extent desired (i.e. generally from about 10% to 90%).

The base acid copolymer is preferably made up of from about 10 to about 30% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the invention may be selected from the group consisting of vinyl esters of aliphatic carboxylic acids wherein the acids have 2 to 10 carbon atoms and vinyl ethers wherein the alkyl groups contain 1 to 10 carbon atoms.

Consequently, examples of a number of copolymers suitable for use in the invention include, but are not limited to, an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains 1 to about 30% by weight unsaturated carboxylic acid, from about 70 to about 99% by weight ethylene and from 0 to about 40% by weight of a softening comonomer.

Along these lines, examples of low acid based copolymers which fulfill the criteria set forth above include but are not limited to the Esco® 5000, 5001, 5020, 5050, 5070, 5100, 5110 and 5200 low acid ethylene-acrylic acid copolymers sold by Exxon and the Primacor™ 1321, 1410, 1410-XT, 1420, 1430, 2912, 3150, 3330, 3340, 3440, 3460, 4311 and 4608 ethylene-acrylic acid copolymers sold by Dow Chemical Company, Midland, Mich. Typical properties of these low acid based copolymers are indicated below in Tables 1A–1C.

TABLE 1A

Escor® EAA Typical properties

| | ASTM Method | Units | Products | | | | |
|---|---|---|---|---|---|---|---|
| | | | 5000 | 5001 | 5020 | 5050 | 5070 |
| Resin Properties | | | | | | | |
| Melt index | D 1238 | g/10 min | 8 | 2 | 8 | 8 | 27 |
| Density | D 1505 | kg/m$^3$ | 931 | 931 | 934 | 936 | 936 |
| Acrylic acid | — | wt % | 6.2 | 6.2 | 7.5 | 9 | 9 |
| DSC Melting Point | E 794 | °C. | 99 | 99 | 97 | 96 | 95 |
| DSC Crystallisation Point | E 794 | °C. | 82 | 84 | 79 | 76 | 71 |
| Vicat Softening Point | D 1525 | °C. | 84 | 84 | 81 | 78 | 77 |
| Plaque Properties (2 mm thick, compression moulded) | | | | | | | |
| Tensile strength | D 638 | MPa | 17 | 20 | 19 | 18 | 16 |
| Yield point | D 638 | MPa | 9 | 9 | 9 | 7 | 6 |
| Elongation | D 638 | % | 600 | 610 | 600 | 575 | 560 |
| 1% Secant Modulus | D 638 | MPa | 145 | 162 | 140 | 125 | 82 |
| Shore Hardness D | D 2240 | — | 48 | 47 | 48 | 48 | 48 |

| | | | 5100 | 5110 | 5200 |
|---|---|---|---|---|---|
| Resin Properties | | | | | |
| Melt index | D 1238 | g/10 min | 8 | 12.5 | 36* |
| Density | D 1505 | kg/m$^3$ | 940 | 940 | 948 |
| Acrylic acid | — | wt % | 11 | 11 | 15 |
| DSC Melting Point | E 794 | °C. | 94 | 94 | 88 |
| DSC Crystallisation Point* | — | °C. | 72 | 71 | 62 |
| Vicat Softening Point | D 1525 | °C. | 74 | 74 | 67 |
| Plaque Properties (2 mm thick, compression moulded) | | | | | |
| Tensile strength | D 638 | MPa | 20 | 18 | 14 |
| Yield point | D 638 | MPa | 7 | 8 | 8 |
| Elongation | D 638 | % | 565 | 545 | 425 |
| 1% Secant Modulus | D 638 | MPa | 105 | 102 | 62 |
| Hardness, Shore D | D 2240 | — | 47 | 47 | 48 |

TABLE 1B

ESCOR® ACID COPOLYMERS
Physical properties of Escor 5100, 5110 and 5200

| Resin property | ASTM Method | Unit | 5100 | 5110 | 5200 |
|---|---|---|---|---|---|
| Melt index | D 1328 | g/10 min. | 8.0 | 12.5 | 36 |
| Density | D 1505 | kg/m$^3$ | 940 | 940 | 948 |
| Acrylic acid | Exxon Chemical | wt % | 11 | 11 | 15 |
| Melting point | E 794 | °C. | 94 | 94 | 88 |
| Crystallization point | E 794 | °C. | 72 | 71 | 62 |
| Vicat softening point | D 1525 | °C. | 74 | 74 | 67 |
| Plaque properties (2 mm thick, compression moulded) | | | | | |
| Tensile at break | D 638 | MPa | 20 | 18 | 14 |
| Yield point | D 638 | MPa | 7 | 8 | 8 |
| Elongation at break | D 638 | % | 565 | 545 | 425 |
| 1% Secant modulus | D 638 | MPa | 105 | 102 | 62 |
| Shore hardness D | D 2240 | | 47 | 47 | 48 |

TABLE 1C

| Property[A] | ASTM Method | Unit | PRIMACOR Polymers | | | | | | | | | | | | | |
|---|---|---|---|---|---|---|---|---|---|---|---|---|---|---|---|---|
| | | | Extrusion Resins | | | | | Extrusion Coating Resins | | | | | | | | |
| | | | 1321 | 1410 | 1410-XT | 1420 | 1430 | 2912 | 3150 | 3330 | 3340 | 3440 | 3460 | 4311 | 4608 |
| PHYSICAL PROPERTIES | | | | | | | | | | | | | | | | |
| Annealed Density | D 792[1] | g/cc | 0.935 | 0.938 | 0.938 | 0.938 | 0.938 | 0.941 | 0.924 | 0.932 | 0.932 | 0.938 | 0.938 | 0.927 | 0.934 |
| Acrylic Acid | | % | 6.5 | 9.5 | 9.5 | 9.5 | 9.5 | 9.5 | 3 | 6.5 | 6.5 | 9.5 | 9.5 | 3 | 6.5 |
| RHEOLOGICAL PROPERTIES | | | | | | | | | | | | | | | | |
| Melt Index (MI) | D 1238 | | 2.5 | 1.5 | 1.5 | 3 | 5 | 12 | 11 | 5.5 | 9 | 10 | 20 | 11 | 7.7 |
| MECHANICAL PROPERTIES | | | | | | | | | | | | | | | | |
| Tensile Modulus | D 638[2] | psi (MPa) | | 18,000 (124) | 18,000 (124) | 18,000 (124) | 18,000 (124) | | | | | | | | |
| Yield Strength | D 638 | psi (MPa) | 1,420 (9.8) | 1,210 (8.3) | 1,210 (8.3) | 1,385 (9.5) | 1,170 (8.1) | 1,230 (8.5) | 1,275 (8.8) | 1,230 (8.5) | 1,145 (7.9) | 1,150 (7.9) | 1,065 (7.3) | 1,560 (10.8) | 1,550 (10.7) |
| Ultimate Tensile Strength | D 638 | psi (MPa) | 2,950 (20.3) | 3,400 (23.4) | 3,400 (23.4) | 3,580 (24.7) | 3,000 (20.7) | 2,430 (16.8) | 1,780 (12.3) | 2,525 (17.4) | 2,500 (17.2) | 2,550 (17.6) | 2,370 (16.3) | 1,780 (12.3) | 2,450 (16.9) |
| Elongation at Break | D 638 | % | 660 | 585 | 585 | 510 | 545 | 580 | 585 | 520 | 630 | 600 | 590 | 600 | 660 |
| THERMAL PROPERTIES | | | | | | | | | | | | | | | | |
| Vicat Softening Temperature | D 1525 | °F. (°C.) | 195 (90.3) | 178 (81) | 178 (81) | 172 (78) | 172 (78) | 169 (76) | 192 (89) | 185 (85) | 183 (84) | 169 (76) | 162 (72) | 198 (92) | 187 (86) |
| FILM PROPERTIES | | | | | | | | | | | | | | | | |
| Film Thickness | | mil (mm) | 2 (0.05) | 2 (0.05) | 2 (0.05) | 2 (0.05) | 2 (0.05) | 0.4 (0.01) | 0.4 (0.01) | 0.8 (0.02) | 0.5 (0.01) | 0.4 (0.01) | 0.4 (0.01) | <0.33 (<0.01) | 0.35 (0.01) |
| Extrusion Temperature | | °F. (°C.) | 400 (204) | 400 (204) | 375 (191) | 400 (204) | 375 (191) | | | | | | | | |
| Blow-Up Ratio (BUR) | | | 2.5 | 2.5 | 2.5 | 2.5 | 2.5 | | | | | | | | |
| Yield Strength | | | | | | | | | | | | | | | | |
| MD | D 882[3] | psi (MPa) | 1,360 (9.4) | 1,250 (8.6) | 1,250 (8.6) | 1,250 (8.6) | 1,170 (8.1) | | | | | | | | |
| CD | D 882 | psi (MPa) | 1,330 (9.2) | 1,150 (7.9) | 1,150 (7.9) | 1,200 (8.3) | 1,150 (7.9) | | | | | | | | |
| Ultimate Tensile Strength | | | | | | | | | | | | | | | | |
| MD | D 882 | psi (MPa) | 4,700 (32.4) | 6,200 (42.7) | 6,200 (42.7) | 5,500 (37.9) | 5,200 (35.9) | | | | | | | | |
| CD | D 882 | psi (MPa) | 4,760 (32.8) | 6,500 (44.8) | 6,500 (44.8) | 5,700 (39.3) | 5,200 (35.9) | | | | | | | | |

TABLE 1C-continued

| Property[A] | ASTM Method | Unit | PRIMACOR Polymers | | | | | | | | | | | |
|---|---|---|---|---|---|---|---|---|---|---|---|---|---|---|
| | | | Extrusion Resins | | | | Extrusion Coating Resins | | | | | | | |
| | | | 1321 | 1410 | 1410-XT | 1420 | 1430 | 2912 | 3150 | 3330 | 3340 | 3440 | 3460 | 4311 | 4608 |
| Elongation at Break | | | | | | | | | | | | | | | |
| MD | D 882 | % | 470 | 470 | 470 | 515 | 525 | | | | | | | | |
| CD | D 882 | % | 570 | 510 | 510 | 545 | 535 | | | | | | | | |
| Dart Impact Energy @ 73° F. (23° C.) | D 1709[4] | g | 410 | 610 | 640 | 425 | 400 | | | | | | | | |
| Elmendorf Tear Resistance | | | | | | | | | | | | | | | |
| MD | D 1922 | g/mil | 255 | 300 | 300 | 380 | 450 | | | | | | | | |
| | | (g/mm) | (10,040) | (11,810) | (11,810) | (14,960) | (17,700) | | | | | | | | |
| CD | D 1922 | g/mil | 305 | 400 | 400 | 500 | 510 | | | | | | | | |
| | | (g/mm) | (12,010) | (15,750) | (15,750) | (19,685) | (20,100) | | | | | | | | |
| Haze | D 1003 | % | 3.7 | 5.5 | 9 | 4 | 3 | 2.8 (71.1) | 2.5 (63.5) | 2 (50.8) | 2.75 (69.9) | 2.6 (66.0) | 2.8 (71.1) | 2.8 (71.1) | 3.3 (83.8) |
| Gloss, 45° | D 2457 | % | 75 | 65 | 50 | 65 | 70 | <(0.25) | | | | | | | |

[A]The data provided for these properties are typical values, intended only as guides, and should not be construed as sales specifications.
[1]D 792; D 1505
[2]D 638; Type 1; 2 in/min (51 mm/min)
[3]D 882; 2 in/min (51 mm/min)
[4]D 1709; Method B Further, examples of high acid base copolymers which fulfill the criteria set forth above, are a series of ethylene-acrylic acid copolymers which are commercially available from The Dow Chemical Company, Midland, Mich., under the "Primacor" designation. These high acid base copolymers exhibit the typical properties set forth below in Table 2.

TABLE 2

Typical Properties of High Acid Primacor Ethylene-Acrylic Acid Copolymers

| GRADE | PERCENT ACID | DENSITY, g/cc | MELT INDEX, g/10 min | TENSILE YD. ST (psi) | FLEXURAL MODULUS (psi) | VICAT SOFT PT (° C.) | SHORE D HARDNESS |
|---|---|---|---|---|---|---|---|
| ASTM | | D-792 | D-1238 | D-638 | D-790 | D-1525 | D-2240 |
| 5980 | 20.0 | 0.958 | 300.0 | — | 4800 | 43 | 50 |
| 5990 | 20.0 | 0.955 | 1300.0 | 650 | 2600 | 40 | 42 |
| 5990 | 20.0 | 0.955 | 1300.0 | 650 | 3200 | 40 | 42 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

[1]The Melt Index values are obtained according to ASTM D-1238, at 190° C.

Other acid copolymers which may be used include an ethylene-methacrylic acid copolymer such as Nucrel® available from E.I. DuPont de Nemours & Co. Nucrel® is an ethylene copolymer which is inherently flexible like EVA copolymers, and which offers desirable performance characteristics similar to those of Surlyn® ionomers.

The Nucrel® acid copolymers are produced by reacting ethylene and methacrylic acid in the presence of free radical initiators. A branched, random ethylene methacrylic acid (EMAA) copolymer is produced thereby. Carboxyl groups are distributed along the chain and interact with carboxyl groups on adjacent molecules to form a weakly cross-linked network through hydrogen bonding.

Nucrel® ethylene copolymers offer tensile strength as high as 25 MPa (3,600 psi) and good performance at low temperatures (945 k J/m$^2$ at −40° C.). Properties of selected Nucrel® ethylene copolymers are listed in Table 3.

TABLE 3

TYPICAL PROPERTIES OF NUCREL® ETHYLENE COPOLYMER RESINS

| PROPERTY | UNITS | ASTM | NUCREL® 010 | NUCREL® 035 | NUCREL® 403 | NUCREL® 410 | NUCREL® 535 |
|---|---|---|---|---|---|---|---|
| Melt Index | dg/min | D1238 | 11 | 35 | 3.0 | 10 | 35 |
| Density | g/cm$^3$ | D792 | .934 | 0.94 | .934 | .933 | .934 |
| Tensile Strength | MPa | D638 | 22.1 | 17.9 | 24.7 | 21.4 | 21.4 |
| | (kpsi) | | (3.2) | (2.6) | (3.6) | (3.1) | (3.1) |
| Elongation | % | D638 | 630 | 640 | 568 | 600 | 580 |
| Flexural Modulus | MPa (kpsi) | D790 | | | | | |
| 23° C. | | | 40.0 | 59 | 152 | 93.8 | 71 |
| (73° F.) | | | (5.8) | (8.6) | (22) | (13.6) | (10.3) |
| Hardness | Shore D | D2240 | 40 | 40 | 53 | 49 | 48 |
| Vicat Softening Temperature | ° C. (° F.) | D1525, Rate B | 64 (147) | 60 (140) | 83 (181) | 80 (176) | 75 (167) |
| Notched Izod | J/m (ft-lb/in) | 256 | NB[1] | 374 (7) | NB | NB | NB |
| Tensile Impact | kJ/m$^2$ (ft-lb/in$^2$) | 1822S | | | | | |
| 23° C. | | | 998 | 1,060 | 756 | 872 | 723 |
| 2(73° F.) | | | (475) | (505) | (360) | (415) | (344) |
| −40° C. | | | 647 | 945 | 442 | 707 | 486 |
| (−40° F.) | | | (308) | (450) | (210) | (336) | (231) |

| PROPERTY | UNITS | ASTM | NUCREL® 599 | NUCREL® 699 | NUCREL® 714 | NUCREL® 925 | NUCREL® 960 |
|---|---|---|---|---|---|---|---|
| Melt Index | dg/min | D1238 | 500 | 88 | 14 | 21 | 60 |
| Density | g/cm$^3$ | D792 | .918 | .937 | .937 | 0.97 | .941 |
| Tensile Strength | MPa | D638 | 10.3 | 15.2 | 22.7 | 25 | 21.4 |
| | (kpsi) | | (1.5) | (2.2) | (3.3) | (3.6) | (3.1) |
| Elongation | % | D638 | 530 | 560 | 560 | 520 | 540 |
| Flexural Modulus | MPa (kpsi) | D790 | | | | | |
| 23° C. | | | 64.8 | 68.3 | 66.9 | 74 | 55.1 |
| (73° F.) | | | (9.4) | (9.9) | (9.7) | (10.8) | (8.0) |
| Hardness | Shore D | D2240 | 42 | 46 | 50 | 50 | 46 |
| Vicat Softening | ° C. | D1525, | 65 | 71 | 74 | 67 | 62 |

TABLE 3-continued

TYPICAL PROPERTIES OF NUCREL ® ETHYLENE COPOLYMER RESINS

| Temperature | (° F.) | Rate B | (149) | (160) | (165) | (153) | (144) |
|---|---|---|---|---|---|---|---|
| Notched Izod | J/m (ft-lb/in) | 256 | NB | NB | NB | 801 (15) | NB |
| Tensile Impact | kJ/m² (ft-lb/in²) | 1822S | | | | | |
| 23° C. | | | 413 | 491 | 812 | 755 | 606 |
| 2(73° F.) | | | (196) | (233) | (386) | (360) | (289) |
| −40° C. | | | 55 | 288 | 465 | 275 | 342 |
| (−40° F.) | | | (26) | (137) | (221) | (130) | (163) |

NB[1]= No Break

The acid copolymers used in the invention are neutralized to a certain percentage through the use of metal cation salts. The metal cation salts utilized are those salts which provide the metal cations capable of neutralizing, to various extents, the carboxylic acid groups of the acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

Additionally a wide variety of pre-neutralized acid copolymers are commercially available. These include both hard and soft pre-neutralized ionomer resins and both low and high acid pre-neutralized ionomer resins.

The hard (high modulus) pre-neutralized ionomers include those ionomers having a hardness greater than 50 on the Shore D scale as measured in accordance with ASTM method D-2240, and a flexural modulus from about 15,000 to about 70,000 psi as measured in accordance with ASTM method D-790.

Although the scope of the patent embraces all known hard ionomeric resins falling within the parameters set forth above, only a relatively limited number of these hard ionomeric resins are commercially available. In this regard, the hard ionomeric resins sold by E.I. DuPont de Nemours Company under the trademark "Surlyn®", and the hard ionomer resins sold by Exxon Corporation under either the trademark "Escor® " or the tradename "Iotek™" are examples of commercially available hard ionomeric resins which may be utilized in the present invention.

The hard ionomeric resins introduced under the designation "Escor®" and now sold under the new designation "Iotek™", are somewhat similar to the hard ionomeric resins sold under the "Surlyn®" trademark. However, since the "Iotek™" ionomeric resins are sodium or zinc salts of poly(ethylene acrylic acid) and the "Surlyn®" resins are zinc or sodium salts of poly(ethylene methacrylic acid) some distinct differences in properties exist. In addition, various blends of "Iotek™" and "Surlyn®" hard ionomeric resins, as well as other available ionomeric resins, may be utilized in the present invention.

Examples of commercially available hard ionomeric resins which may be utilized in the present invention include the hard sodium ionic copolymer sold under the trademark "Surlyn® 8940" and the hard zinc ionic copolymer sold under the trademark "Surlyn® 9910". Surlyn® 8940 is a copolymer of ethylene with methacrylic acid with about 15 weight percent acid which is about 29% neutralized with sodium ions. This resin has an average melt flow index of about 2.8. Surlyn® 9910 is a copolymer of ethylene and methacrylic acid with about 15 weight percent acid which is about 58% neutralized with zinc ions. The average melt flow index of Surlyn® 9910 is about 0.7. The typical properties of Surlyn® 9910 and 8940 are set forth below in Table 4.

TABLE 4

Typical Properties of Commercially Available Hard Surlyn ® Resins Suitable for Use in the Present Invention

| | ASTM D | 8940 | 9910 | 8920 | 8528 | 9970 | 9730 |
|---|---|---|---|---|---|---|---|
| Cation Type | | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific Gravity, g/cm³ | D-792 | 0.95 | 0.97 | 0.95 | 0.94 | 0.95 | 0.95 |
| Hardness, Shore D | D-2240 | 66 | 64 | 66 | 60 | 62 | 63 |
| Tensile Strength, (kpsi) MPa | D-638 | (4.8) 33.1 | (3.6) 24.8 | (5.4) 37.2 | (4.2) 29.0 | (3.2) 22.0 | (4.1) 28.0 |
| Elongation, % | D-638 | 470 | 290 | 350 | 450 | 460 | 460 |
| Flexural Modulus, (kpsi) MPa | D-790 | (51) 350 | (48) 330 | (55) 380 | (32) 220 | (28) 190 | (30) 210 |
| Tensile Impact (23° C.) KJ/m² (ft.-lbs./in²) | D-18225 | 1020 (485) | 1020 (485) | 865 (410) | 1160 (550) | 760 (360) | 1240 (590) |
| Vicat Temperature, ° C. | D-1525 | 63 | 62 | 58 | 73 | 61 | 73 |

In addition, examples of acrylic acid based hard ionomer resins suitable for use in the present invention include those sold under the "Iotek™" tradename by the Exxon Corporation. Examples of such acrylic acid based hard ionomer resins are "Iotek™ 4000" (formerly "Escor 4000"), "Iotek™ 4010", "Iotek™ 8000" (formerly Escor 900), "Iotek™ 8020", and "Iotek™ 8030". The typical properties of the Iotek™ hard ionomers are set forth below in Table 5.

ized methacrylic acid based ionomers having a Shore D hardness of 25–40 and a flex modulus of 2,000–10,000.

More preferably, the inventors have found that when the new ethylene-acrylic acid based soft pre-neutralized ionomer resins recently developed by the Exxon Corporation under the designations "Iotek™ 7520"(referred experimentally by differences in neutralization and melt indexes as

TABLE 5

Typical Properties of Iotek ™ Ionomers

| | ASTM Method | Units | 4000 | 4010 | 8000 | 8020 | 8030 |
|---|---|---|---|---|---|---|---|
| Resin Properties | | | | | | | |
| Cation type | | | zinc | zinc | sodium | sodium | sodium |
| Melt index | D-1238 | g/10 min. | 2.5 | 1.5 | 0.8 | 1.6 | 2.8 |
| Density | D-1505 | kg/m$^3$ | 963 | 963 | 954 | 960 | 960 |
| Melting Point | D-3417 | ° C. | 90 | 90 | 90 | 87.5 | 87.5 |
| Crystallization Point | D-3417 | ° C. | 62 | 64 | 56 | 53 | 55 |
| Vicat Softening Point | D-1525 | ° C. | 62 | 63 | 61 | 64 | 67 |
| % Weight Acrylic Acid | | | 16 | | 11 | | |
| % of Acid Groups cation neutralized | | | 30 | | 40 | | |
| Plaque Properties (3 mm thick, compression molded) | | | | | | | |
| Tensile at break | D-638 | MPa | 24 | 26 | 36 | 31.5 | 28 |
| Yield point | D-638 | MPa | none | none | 21 | 21 | 23 |
| Elongation at break | D-638 | % | 395 | 420 | 350 | 410 | 395 |
| 1% Secant modulus | D-638 | MPa | 160 | 160 | 300 | 350 | 390 |
| Shore Hardness D | D-2240 | — | 55 | 55 | 61 | 58 | 59 |
| Film Properties (50 micron film 2.2:1 Blow-up ratio) | | | | | | | |
| Tensile at Break | | | | | | | |
| MD | D-882 | MPa | 41 | 39 | 42 | 52 | 47.4 |
| TD | D-882 | MPa | 37 | 38 | 38 | 38 | 40.5 |
| Yield point | | | | | | | |
| MD | D-882 | MPa | 15 | 17 | 17 | 23 | 21.6 |
| TD | D-882 | MPa | 14 | 15 | 15 | 21 | 20.7 |
| Elongation at Break | | | | | | | |
| MD | D-882 | % | 310 | 270 | 260 | 295 | 305 |
| TD | D-882 | % | 360 | 340 | 280 | 340 | 345 |
| 1% Secant modulus | | | | | | | |
| MD | D-882 | MPa | 210 | 215 | 390 | 380 | 380 |
| TD | D-882 | MPa | 200 | 225 | 380 | 350 | 345 |
| Dart Drop Impact | D-1709 | g/micron | 12.4 | 12.5 | 20.3 | | |

Further, as indicated above, pre-neutralized soft ionomer resins can also be used in the present invention. The soft (low modulus) pre-neutralized ionomers are generally acrylic acid or methacrylic acid based soft ionomers. Preferably, the soft pre-neutralized ionomer is a zinc based ionomer made from an acrylic acid base polymer and an unsaturated monomer of the acrylate ester class. The soft (low modulus) ionomers have a hardness from about 20 to about 40 (preferably from about 30 to about 40) as measured on the Shore D scale and a flexural modulus from about 2,000 to about 10,000 psi (preferably from about 3,000 to 7,000 psi) as measured in accordance with ASTM method D-790.

Examples of such soft pre-neutralized ionomer resins include Surlyn® 8265 and 8269. These are sodium neutral- LDX 195, LDX 196, LDX 218 and LDX 219) are used either alone or combined with hard pre-neutralized ionomers, the compositions produce higher C.O.R.s at equal or softer hardness, higher melt flow (which corresponds to improved, more efficient molding, i.e. fewer rejects), as well as significant cost savings versus balls produced by the pre-neutralized methacrylic acid ionomer blends due to lower overall raw materials cost and improved yields.

While the exact chemical composition of the resins to be sold by Exxon under the designation Iotek™ 7520 is considered by Exxon to be confidential and proprietary information, Exxon's Experimental Product Data sheet lists the following physical properties of this ethylene acrylic acid zinc ionomer developed by Exxon:

TABLE 6

Physical Properties of Iotek ™ 7520

| Property | ASTM Method | Units | Typical Value |
|---|---|---|---|
| Melt Index | D-1238 | g/10 min. | 2 |
| Density | D-1505 | kg/m$^3$ | 0.962 |
| Cation | | | Zinc |
| Melting Point | D-3417 | °C. | 66 |
| Crystallization Point | D-3417 | °C. | 49 |
| Vicat Softening Point | D-1525 | °C. | 42 |
| Plaque Properties (2 mm thick Compression Molded Plaques) | | | |
| Tensile at Break | D-638 | MPa | 10 |
| Yield Point | D-638 | MPa | None |
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |
| Zwick Rebond | ISO 4862 | % | 52 |
| De Mattia Flex Resistance | D-430 | Cycles | >5000 |

In addition, test data collected by the inventors indicate that Iotek™ 7520 resins have Shore D hardnesses of about 32–36 (per ASTM D-2240), melt flow indexes of 3±5 g/10 min (at 190° C. per ASTM D-1288), a flexural moduluses of about 2500–3500 psi (17–24 MPa)(per ASTM D-790). Furthermore, testing by an independent testing laboratory by pyrolysis mass spectrometry indicates that the Iotek™ 7520 resins are generally zinc salts of a terpolymer of ethylene, accrylic acid, and methyl acrylate.

Moreover, the inventors have found that a newly developed grade of an acrylic acid based soft pre-neutralized ionomer available from Exxon Corporation under the designation Iotek™ 7510, is also effective in producing golf ball covers exhibiting higher C.O.R. values at equal or softer hardness than those produced by the methacrylic acid ionomer blends. In this regard, Iotek™ 7510 has the advantages (i.e. improved flow, higher C.O.R. values at equal hardness, increased clarity, etc.) produced by the Ioteck™ 7520 resin when compared to the methacrylic acid base soft ionomers known in the art (such as the Surlyn® 8625 and the Surlyn® 8629).

In addition, Iotek™ 7510, when compared to Iotek™ 7520, produces slightly higer C.O.R. values at equal softness/hardness due to the Iotek™ 7510's higher hardness and neutralization. Similarly, Iotek™ 7510 produces better releas properties (from the mold cavities) due to its slightly higer stiffness and lower flow rate than Iotek™ 7520. Consequently, Iotek™ 7510 is the more preferred soft ionomer used in the invention.

According to Exxon, Iotek™ 7510 is of similar chemical composition as Iotek™ 7520 (i.e. a zinc salt of a terpolymer of ethylene, acrylic acid, and methyl acrylate) but is more highly neutralized. Based upon FTIR analisis, Iotek™ 7520 is estimated to be about 30–40 wt.-% neutralized and Iotek™ 7510 is estimated to be about 40–60 wt.-% neutralized. The typical properties of Iotek™ 7510 in comparasion of those of Iotek™ 7520 are set forth below.

TABLE 7

Physical Properties of Iotek ™ 7510 in Comparison to Iotek ™ 7520

| | Iotek ™ 7520 | Iotek ™ 7510 |
|---|---|---|
| MI, g/10 min | 2.0 | 0.8 |
| Density, g/cc | 0.96 | 0.97 |
| Melting Point, ° F. | 151 | 149 |
| Vicat Softening Point, ° F. | 108 | 109 |
| Flex Modulus, psi | 3800 | 5300 |
| Tensile Strength, psi | 1450 | 1750 |
| Elongation, % | 760 | 690 |
| Hardness, Shore D | 32 | 35 |

Moreover, in addition to the pre-neutralized low acid ionomer resins, several pre-neutralized high acid ionomer resins are now commercially available. Examples of the high acid methacrylic acid based ionomers suitable for use in accordance with this invention include Surlyn® AD-8422 (sodium cation), Surlyn® 8162 (zinc cation), Surlyn® SEP-503-1 (zinc cation), and Surlyn® SEP-503-2 (magnesium cation). According to Dupont, all of these ionomers contain from about 18.5 to about 21.5% by weight methacrylic acid.

More particularly, Surlyn® AD-8422, is currently commercially available from DuPont in a number of different grades (i.e. AD-8422-2, AD-8422-3, AD-8422-5, etc.) based upon differences in melt index. According to DuPont, Surlyn® AD-8422 offers the following general properties when compared to Surlyn® 8920 the stiffest, hardest of all of the low acid grades:

TABLE 8

| | LOW ACID (15 wt % Acid) | HIGH ACID (>20 wt % Acid) | |
|---|---|---|---|
| | SURLYN® 8920 | SURLYN® 8422-2 | SURLYN® 8422-3 |
| IONOMER | | | |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP$^1$, ° C. | 88 | 86 | 85 |
| FP$^1$, ° C. | 47 | 48.5 | 45 |
| COMPRESSION MOLDING$^2$ | | | |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

$^1$DSC second heat, 10° C./min heating rate.
$^2$Samples compression molded at 150° C. annealed 24 hours at 60° C. 8422-2, -3 were homogenized at 190° C. before molding.

In comparing Surlyn® 8920 to Surlyn® 8422-2 and Surlyn® 8422-3, it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn® SEP-503-1 (zinc cation) and Surlyn® SEP-503-2 (magnesium cation) are high acid zinc and magnesium versions of the Surlyn® AD 8422 high acid ionomers. When compared to the Surlyn® AD 8422 high acid ionomers, the Surlyn® SEP-503-1 and SEP-503-2 ionomers can be defined as follows:

TABLE 9

| Surlyn ™ Ionomer | Ion | Melt Index | Neutralization % |
|---|---|---|---|
| AD 8422-3 | Na | 1.0 | 45 |
| SEP 503-1 | Zn | 0.8 | 38 |
| SEP 503-2 | Mq | 1.8 | 43 |

Furthermore, Surlyn® 8162 is a zinc cation ionomer resin containing approximately 20% by weight (i.e. 18.5–21.5% weight) methacrylic acid copolymer that has been 30–70% neutralized. Surlyn® 8162 is currently commercially available from DuPont.

Further examples of the pre-neutralized high acid acrylic acid based ionomers suitable for use in the present invention include the Escor® or Iotek™ high acid ethylene acrylic acid ionomers recently produced by Exxon. In this regard, Escor® or Iotek™ 959 is a sodium ion neutralized ethylene-acrylic acid copolymer and Escor® or Iotek™ 960 is a zinc neutralized ethylene-acrylic acid copolymer. According to Exxon, Iotek™ 959 and Iotek™ 960 contain from about 19.0 to about 21.0% by weight acrylic acid with approximately 30 to about 70 percent of the acid groups neutralized with sodium and zinc ions respectfully. The physical properties of these high acid acrylic acid based ionomers are as follows:

TABLE 10

| PROPERTY | ESCOR ® (IOTEK ™) 959 | ESCOR ® (IOTEK ™) 960 |
|---|---|---|
| Melt Index, g/10 min | 2.0 | 1.8 |
| Cation | Sodium | Zinc |
| Melting Point, ° F. | 172 | 174 |
| Vicat Softening Point, ° F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

As briefly discussed above, the cover composition of the invention comprises of about 0–90 percent by weight of at least one neutralized acid copolymer, preferably about 0–50 percent, and most preferably 0–75 percent acid copolymer. At the same time, the cover may comprise about 100–10 percent by weight of at least one neutralized ethylene alkyl acrylate copolymer, preferably 100–25 percent, and most preferably 100–50 percent ethylene alkyl acrylate copolymer.

Generally, the ethylene alkyl acrylate copolymers used herein include the copolymers of ethylene and acrylic or methacrylic esters of linear, branched or cyclic alkanols. Preferably, the copolymers contain from about 1–30 weight percent alkyl acrylate and from about 99–70 weight percent ethylene.

Ethylene alkyl acrylate copolymers which may be used include, among others, ethylene-ethyl acrylate (EEA), ethylene-methyl acrylate (EMA), and ethylene-butyl acrylate (EBA) copolymers.

Ethylene-ethyl acrylate (EEA) copolymers are made by the polymerization of ethylene units with randomly distributed ethylene acrylate (EA) comonomer groups. The (EEA) copolymers contain up to about 30% by weight of ethylene-acrylate. They are tough, flexible products having a relatively high molecular weight. They have good flexural fatigue and low temperature properties (down to −65° C.). In addition, EEA resists environmental stress cracking as well as ultraviolet radiation.

Examples of ethylene-ethyl acrylate which may be utilized include Bakelite® DPD-6169 or Bakelite® DPD-6182 available from Union Carbide. Properties of these and other suitable ethylene-ethyl acrylate copolymers include:

TABLE 11

TYPICAL PROPERTIES OF UNION CARBIDE ETHYLENE-ETHYL ACRYLATE

| PROPERTY | TEST METHOD | DPD-6169 | DPD-6182 | DPD-9169 |
|---|---|---|---|---|
| Melt Index, g/10 minutes | D 1238 | 6 | 1.5 | 20 |
| Density, g/cm$^2$ | D 1505 | 0.931 | 0.930 | 0.931 |
| Flexural Modulus, psi[a] | D 790 | 9,500 | 13,000 | 9,000 |
| Secant Modulus of Elasticity, psi[a] | D 638 | 5,000 | 6,200 | 4,300 |
| Ultimate Elongation, %[a] | D 638 | 700 | 700 | 750 |
| Tensile Strength, psi[a] | D 638 | 1,600 | 2,100 | 700 |
| Yield Strength, psi[b] | D 638 | 550 | 700 | |
| Bent Strip Stress Cracking Resistance, 100% "Igepal" Solvent, $F_{50}$, hours | D 1693 | >500 | <1,000 | 350 |
| Durometer Hardness, | D 676 | | | |
| "A" | | 88 | 87 | 86 |
| "D" | | 32 | 32 | 31 |
| Brittleness Index, 50% Failure, ° C. | D 746 | −105 | 66 | |
| Vicat Softening Point, ° C. | D 1525 | 64 | | |
| Compression Set, 10 days at 23° C., % recovery | D 395 | 56 | | |

[a]Determined on 0.075-inch compression molded plaques.
[b]Determined on 0.075-inch compression molded plaques. Material has no true yield point. Value represents tensile strength at 50% elongation.

EEA is similar to ethylene vinyl acetate (EVA) in its density-property relationships and high-temperature resistance. In addition, like EVA, EEA is not resistant to aliphatic and aromatic hydrocarbons. For comparison purposes, some typical properties of ionomers as well as ethylene vinyl acetate and ethylene ethyl acrylate are provided below:

TABLE 12

TYPICAL PROPERTIES OF IONOMERS AND EEA

| | Ionomer | EVA | EEA | UNITS |
|---|---|---|---|---|
| Specific gravity | 0.93 | 0.93–0.95 | 0.93 | |
| Yield strength | 2.2 | 1.3 | 1.05 | $10^3 lbf/in^2$ |
| Tensile modules | 28–40 | 11 | 6 | $10^3 lbf/in^2$ |
| Usual form of fracture | tough | tough | tough | |
| Vicat softening point | 71 | 83 | 64 | ° C. |
| ASTM brittleness temperature | −100 | −70 | −100 | ° C. |
| Power Factor $10^2 Hz$ | 0.0015 | 0.0024 | 0.001 | |
| Dielectric constant $10^3 Hz$ | 2.5 | 2.8 | 2.8 | |

Ethylene-methyl acrylate (EMA) copolymers contain up to about 30% by weight of methyl acrylate and yield blown films having rubberlike limpness and high impact strength. These copolymers may be useful in coating and laminating applications as a result of their good adhesion to commonly used substrates. EMAs have good heat-seal characteristics.

Ethylene-methyl acrylate copolymers are manufactured by reacting, at high temperatures and pressures, methyl-acrylate monomers with ethylene and free radical initiators. Polymerization occurs such that the methyl acrylate forms random pendant groups on the polyethylene backbone. The acrylic functionality decreases resin crystallinity and increases polarity to enhance resin properties. The properties depend on molecular weight (determined by melt index) and percent crystallinity. Percent crystallinity is determined by comonomer incorporation. As the comonomer content increases, the film become softer; tougher, and easier to heat seal.

EMA films have low modulus (<10,000 psi), low melting points, and good impact strength. In addition, the EMA resins are highly polar, and as a result are compatible with olefinic and other polymers. They adhere well to many substrates including LDPE, LLDPE, and EVA.

Examples of ethylene-methyl acrylate which may be used in the golf ball cover compositions of the present invention include the Optema™ or Escor® EMA copolymer resins available from Exxon Chemical Company. The Optema™/Escor® EMA resins are thermally stable ethylene methyl acrylate resins which will accept up to 65% or more fillers and pigments without losing their properties. They are more thermally stable than EVAs and can be extruded or molded over a range of 275–625° F. (compared to an EVA limit of 450° F.). EMAs are generally not corrosive when compared to EVAs, EAAs and ionomers. Some of the typical properties associated with the various grades of Optema™ EMA resins are found in the following Table 13:

TABLE 13

PROPERTIES OF OPTEMA ™ EMA RESINS

| | MELT INDEX dg/min (ASTM D1238) | METHYL ACRYLATE WT % | DENSITY g/cm$^3$ (ASTM D1505) | TENSILE STRENGTH psi (MPa) (ASTM D638) | FLEXURAL MODULUS psi (MPa) (ASTM D790) |
|---|---|---|---|---|---|
| OPTEMA GRADE | | | | | |
| TC 020 | 6.0 | 6.5 | 0.928 | 1700 (12) | 17500 (120) |
| TC 115 | 0.7 | 16.5 | 0.938 | 1900 (13) | 8300 (57) |
| TC 114 | 3.2 | 18.0 | 0.948 | 1700 (12) | 7100 (49) |
| TC 110 | 2.0 | 21.5 | 0.942 | 1600 (11) | 5100 (35) |
| TC 111 | 2.0 | 21.5 | 0.944 | 1600 (11) | 5100 (35) |
| TC 120 | 6.0 | 20. | 0.942 | 1600 (11) | 5100 (35) |
| TC 130 | 20.0 | 21.5 | 0.941 | 1300 (9) | 4900 (34) |
| TC 140 | 135.0 | 21.5 | 0.939 | 1200 (8) | 4900 (34) |
| TC 113 | 1.0 | 23.5 | 0.939 | 1600 (11) | 3700 (26) |
| TC 220 | 5.0 | 24.0 | 0.945 | 1300 (9) | 3900 (27) |
| TC 221 | 5.0 | 27.0 | 0.948 | 1100 (8) | 2800 (19) |
| DEVELOPMENTAL GRADES | | | | | |
| XS-11.04 | 6.0 | 6.0 | 0.933 | 1410 (13.3) | 11,4000 (78.6) |
| XS-12.04 | 3.0 | 28.0 | 0.953 | 760 (5.0) | 1210 (8.3) |
| XS-13.04 | 135.0 | 20. | 0.940 | 700 (4.8) | 2800 (19) |

| | MELTING POINT ° F. (° C.) | HARDNESS SHORE A/D (ASTM D2240) | TENSILE IMPACT @ 73° F. (23° C.) (ASTM D1822) | ELONGATION % (ASTM D638) | VICAT SOFTENING PT (10,000) (ASTM D1525) |
|---|---|---|---|---|---|
| OPTEMA GRADE | | | | | |
| TC 020 | 215 (102) | >90/45 | 170 (360) | >800 | 172 (78) |
| TC 115 | 185 (85) | 91/41 | 260 (550) | >800 | 149 (65) |
| TC 114 | 178 (81) | 89/38 | 260 (570) | >800 | 133 (56) |
| TC 110 | 167 (75) | 86/36 | 270 (570) | >800 | 126 (52) |
| TC 111 | 167 (75) | 86/36 | 270 (570) | >800 | 126 (52) |
| TC 120 | 169 (76) | 86/35 | 250 (520) | >800 | 117 (47) |
| TC 130 | 167 (75) | 85/33 | 230 (480) | >800 | 109 (43) |
| TC 140 | 162 (72) | 84/32 | 170 (360) | >800 | 97 (36) |
| TC 113 | 165 (74) | 83/33 | 310 (650) | >800 | 122 (50) |
| TC 220 | 156 (69) | 82/32 | 280 (580) | >800 | 109 (43) |
| TC 221 | 147 (64) | 79/28 | 280 (590) | >800 | 102 (39) |
| DEVELOPMENTAL GRADES | | | | | |
| XS-11.04 | 225 (107) | 90/35 | 170 (363) | 1450 | 182 (84) |
| XS-12.04 | 145 (63) | 70/17 | — | 1060 | — |
| XS-13.04 | 171 (77) | 82/25 | — | 1400 | 121 (50) |

Certain developmental grades of Optema™ EMAs may be used in formulating the golf ball covers herein. These developmental grades of resins are designated "XS". Pertinent properties of XS-11.04, 12.04 and 13.04 are set forth above in Table 13. Melt index and methyl acrylate content of these and certain others are set forth in the following Table 14:

TABLE 14

PROPERTIES OF OPTEMA ™ DEVELOPMENTAL EMA RESINS

| OPTEMA/GRADE | MELT INDEX (dg/min) | METHYL ACRYLATE CONTENT (%) |
|---|---|---|
| XS-53.04 | 0.7 | 15 |
| XS-54.04 | 1.0 | 24 |
| XS-34.14* | 2.0 | 20 |
| XS-12.04 | 3.0 | 28 |
| XS-61.48 | 5.0 | 24 |
| XS-55.48 | 5.0 | 28 |
| XS-11.04 | 6.0 | 6 |
| XS-13.04 | 135.0 | 20 |

*Slip and antiblock added.

Ethylene butyl acrylates (EBA) can also be included in the invention. These are generally similar to ethylene methyl acrylate (EMA) with improved low temperature impact strength and high clarity.

Chevron Chemical Company's ethylene-butyl acrylate copolymer, EBAC™, is stable at high temperatures, and may be processed as high as 600° F. Typical properties (or average values) of certain EBAC™ copolymers are set forth below in Table 15.

various extents, the carboxylic acid esters groups of the ethylene alkyl copolymers. This converts the alkyl ester into a metal salt of the acid. These metal cation salts include oxide, carbonate or hydroxide salts of alkali metals such as lithium, sodium and potassium or mixtures thereof.

Examples of such lithium ion sources are lithium hydroxide monohydrate, lithium hydroxide, lithium carbonate and lithium oxide. Examples of sodium ion sources are sodium hydroxide, sodium oxide and sodium carbonate. Sources for the potassium ion include potassium hydroxide, potassium oxide and potassium carbonate.

The amount of metal cation salt (preferably an alkali metal cation salt) reacted with the ethylene alkyl acrylate copolymer varies depending upon such factors as the reactivity of the salt and the copolymer used, reaction conditions (temperature, pressure, moisture content, etc.) and the desired level of conversion. Preferably, the conversion reaction occurs through saponification wherein the carboxylic acid esters of the ethylene alkyl acrylate copolymer are converted by alkaline hydrolysis to form the salt of the acid and alcohol. Examples of such saponification reactions are set forth in U.S. Pat. Nos. 3,970,626, 4,638,034 and 5,218,057 and are incorporated herein by reference.

The products of the conversion reaction are an alkanol (the alkyl group of which comes from the alkyl acrylate comonomer) and a terpolymer of ethylene, alkyl acrylate, and an alkali metal salt of the (meth) acrylic acid. The degree of conversion or saponification is variable depending on the amount of alkali metal cation salt used and the saponification conditions. Generally from about 10% to about 60% of the ester groups are converted during the saponification reaction. The alkanol and other by products can be removed

TABLE 15

PROPERTIES OF ETHYLENE-BUTYL ACRYLATE COPOLYMERS (EBAC ™)

| PROPERTIES | UNITS | ASTM | EBAC ™ DS-1263-70 | EBAC ™ DS-1120-70 | EBAC ™ DS-1122-70 | EBAC ™ DS-1123-70 | EBAC ™ DS-1256-70 |
|---|---|---|---|---|---|---|---|
| Melt Flow | gms/10 min | D-1238 | 0.5 | 2.0 | 6.0 | 20 | 3.0 |
| Butyl Acrylate Content | % | — | 18 | 20 | 20 | 20 | 28.0 |
| Density | gm/cc | D-1505 | 0.927 | 0.927 | 0.927 | 0.927 | 0.927 |
| Melting Point | ° C. | — | 91 | 90 | 87 | 88 | 74 |
| Vicat Softening Point | ° C. | D-1525 | 65 | 60 | 55 | 49 | — |
| Brittleness Temperature | ° C. | D-746 | <−76 | <−75 | <−75 | <−75 | <−76 |
| Hardness | | | | | | | |
| Shore A | — | D-2240 | — | — | 88 | 88 | 74 |
| Shore D | — | D-2240 | 38 | 33 | — | 27 | 23 |
| Flexural Stiffness | psi | D-747 | 4000 | — | — | 3000 | — |
| Tensile Ultimate[2] | psi | D-638 | 2000 | 1400 | 1100 | 680 | 760 |
| Tensile @ Break[2] | psi | D-638 | 1900 | 1400 | 1100 | 680 | 760 |
| Elongation @ Point Break[2] | % | D-638 | 810 | 900 | 850 | 620 | 950 |

[1] Melt Flow testing of condition E, 190° C. and 2.16 kg weight.
[2] Tensile Properties determined with Type IV compression molded samples, 20"/min crosshead speed.

The cation salts utilized in the invention for neutralizing the ethylene alkyl copolymers are those salts which provide the metal cations capable of hydrolyzing and neutralizing, to by normal separation processes leaving the remaining metal cation neutralized (or hydrolysized) ester-based ionomer resin reaction product.

Alternatively, the ethylene alkyl acrylate copolymer included in the invention can be commercially obtained in a pre-neutralized or saponifized condition. For example, a number of metal cation neutralized ester-based ionomer resins produced under the saponification process of U.S. Pat. No. 5,218,057 are available from the Chevron Chemical Company of Houston, Tex. In this regard, Chevron sells several sodium neutralized ester-based ionomer resins chemically based on ethylene methyl acrylate and ethylene butyl acrylate under the trademark "IMAC™". According to Chevron, the IMAC™ sodium neutralized ester-based ionomer resins offer property differences over the Suryln® and Iotek™™ resins. This is shown below.

TABLE 16

IMAC ™ PHYSICAL CHARACTERISTICS

| Property | IMAC | Surlyn ® | Iotek ™ |
|---|---|---|---|
| Tensile @ Break (psi) | 1600–3000 | 2800–5100 | 1700–4800 |
| Flexural Modulus (psi) | 17000–37000 | 25000–51000 | 5000–52000 |
| Flexural Stiffness (psi) | 13000–28000 | 17000–42000 | |
| Izod Impact (ft. lb./in.) | 4–8 | 8–17 | |
| Melting Point (C) | 83–100 | 81–99 | 67–87 |
| Elongation (%) | 170–320 | 150–500 | 400–700 |
| Vicat (C) | 55–80 | 65–80 | |

Examples of such sodium neutralized ester-based ionomer resins are the development specialty ("DS") resins available from Chevron under the designation IMAC DS 4032, DS 3076, DS 1993 and DS 3088. According to Chevron, these materials are based upon ethylene methyl acrylates (EMA) having 10–25% methyl acylate and the level of neutralization for the DS 4032, DS 3076 and DS 1993 is slightly less than 50% (Chevron DS 3088 has a lower level of neutralization). Along these lines, the following typical properties are provided by Chevron for IMAC DS 4032:

TABLE 17

DS4032*
Extrusion Grade Ionomer Resin

| PROPERTIES | TYPICAL VALUES | UNITS | ASTM TEST METHOD |
|---|---|---|---|
| GENERAL | | | |
| Melt Flow[1] | 0.8 | gms/10 min. | D-1238 |
| Tensile @ Break[2] | 2800 | psi | D-638 |
| Elongation @ Break[2] | 240 | % | D-638 |
| Flexural Stiffness | 23,700 | psi | D-747-58T |
| Flexural Modulus | 35,200 | psi | D-790-66 |
| Notched Izod | 4.5 | ft.lbs./inch | D-256 |
| Vicat Softening Point | 73 | ° C. | D-1525 |
| Melting Point by DSC | 76 | ° C. | — |
| BLOWN FILM PROPERTIES | | | |
| Nominal Film Thickness | 1.5 | mil | |
| Haze | <1 | % | D-1003 |
| Gloss (60%) | >140 | % | D-2457 |
| Tensile @ Break, MD | 3110 | psi | D-882 |
| TD | 1600 | psi | |
| Elongation @ Break, MD | 225 | % | D-882 |
| TD | 360 | % | |

TABLE 17-continued

DS4032*
Extrusion Grade Ionomer Resin

| PROPERTIES | TYPICAL VALUES | UNITS | ASTM TEST METHOD |
|---|---|---|---|
| PROCESSING CONDITIONS | | | |
| Extruder | LDPE Type | | |
| Screw | LDPE Type | | |
| Die Lip Opening | 25–35 mils | | |
| Melt Temperature | 380–400° F. | | |
| Blow-Up Ratio | Can be Widely Varied to Achieve Desired Film Width | | |
| Air Ring Type | Dual Lip preferred, Single Lip Acceptable | | |
| RESIN TYPE | * Olefinic Ionomer | | |
| | * Melt Index 0.8 gms/10 min. | | |
| | * Processing Temperature Range –350–400° F. | | |
| CHARACTERISTICS | * Excellent Heat Seal and Hot Tack Properties | | |
| | * Superior Clarity | | |
| | * Excellent Toughness, Flexibility and Low Temperature Properties | | |
| | * Excellent Heat Stability | | |
| | * Non-Corrosive at Extrusion Temperatures | | |
| | * FDA Clearance per 21CFR §176.1600 (Certification Letter Available Upon Request) | | |
| APPLICATIONS | * Skin Packaging | | |
| | * Heat Seal Layers | | |
| | * Lamination Films | | |
| | * Coextrusion | | |

[1]Melt Flow tested at Condition E, 190° C. and 2.16 KG. Weight.
[2]Tensile properties determined using 0.125" thick injection molded samples at 20"min. crosshead speed.

In addition, the Chevron IMAC ionomer resins have the following general characteristics:

| ETHYLENE METHYL ACRYLATE COPOLYMER IONOMERS | |
|---|---|
| Methyl Acrylate levels range from 12–24% | |
| DS 4032 | Methyl Acrylate low level (12–15%) |
| | Na neutralized (slightly less than 50% of sites converted) |
| DS 3076 | Methyl Acrylate mid level (15–20%) |
| | Na neutralized (slightly less than 50% of sites converted) |
| DS 1993 | Methyl Acrylate high level (20–24%) |
| | Na neutralized (slightly less than 50% of sites converted) |
| DS 3088 | Methyl Acrylate high level (same as 1993) (20–24%) |
| | Na neutralized (low % of sites converted) |
| ETHYLENE BUTYL ACRYLATE COPOLYMERS | |
| DS 3053 | 18% Butyl Acrylate   unneutralized |
| DS 3054 | 20% Butyl Acrylate   unneutralized |
| DS 3052 | 5% Butyl Acrylate   unneutralized |

Additional compatible additive materials may also be added to the cover compositions of the present invention, such as dyes (for example, Ultramarine Blue sold by Whitaker, Clark, and Daniels of South Painsfield, N.J.), and pigments, i.e. white pigments such as titanium dioxide (for example Unitane 0–110) zinc oxide, and zinc sulfate, as well as fluorescent pigments. As indicated in U.S. Pat. No. 4,884,814, the amount of pigment and/or dye used in conjunction with the polymeric cover composition depends on the particular base ionomer mixture utilized and the particular pigment and/or dye utilized. The concentration of the pigment in the polymeric cover composition can be from about 1% to about 10% as based on the weight of the base ionomer mixture. A more preferred range is from about 1% to about 5% as based on the weight of the base ionomer mixture. The most preferred range is from about 1% to about 3% as based on the weight of the base ionomer mixture. The most preferred pigment for use in accordance with this invention is titanium dioxide.

Moreover, since these are various hues of white, i.e. blue white, yellow white, etc., trace amounts of blue pigment may be added to the cover stock composition to impart a blue white appearance thereto. However, if different hues of the color white are desired, different pigments can be added to the cover composition at the amounts necessary to produce the color desired.

In addition, it is within the purview of this invention to add to the cover compositions of this invention compatible materials which do not affect the basic novel characteristics of the composition of this invention. Among such materials are antioxidants (i.e. Santonox R), antistatic agents, stabilizers and processing aids. The cover compositions of the present invention may also contain softening agents, such as plasticizers, etc., and reinforcing materials such as glass fibers and inorganic fillers, as long as the desired properties produced by the golf ball covers of the invention are not impaired.

Furthermore, optical brighteners, such as those disclosed in U.S. Pat. No. 4,679,795, may also be included in the cover composition of the invention. Examples of suitable optical brighteners which can be used in accordance with this invention are Unitex OB as sold by the Ciba-Geigy Chemical Company, Ardaley, N.Y. Unitex OB is thought to be 2,5-Bis (5-tert-butyl-2-benzoxazoly) thiophene. Examples of other optical brighteners suitable for use in accordance with this invention are as follows: Leucopure EGM as sold by Sandoz, East Hanover, N.J. 07936. Leucopure EGM is thought to be 7-(2h-naphthol (1,2-d)-triazol-2yl)-3phenylcoumarin. Phorwhite K-20G2 is sold by Mobay Chemical Corporation, P.O. Box 385, Union Metro Park, Union, N.J. 07083, and is thought to be a pyrazoline derivative, Eastobrite OB-1 as sold by Eastman Chemical Products, Inc. Kingsport, Tenn., is thought to be 4,4-Bis (-benzoxaczoly) stilbene. The above-mentioned Uvitex and Eastobrite OB-1 are preferred optical brighteners for use in accordance with this invention.

Moreover, since many optical brighteners are colored, the percentage of optical brighteners utilized must not be excessive in order to prevent the optical brightener from functioning as a pigment or dye in its own right.

The percentage of optical brighteners which can be used in accordance with this invention is from about 0.01% to about 0.5% as based on the weight of the polymer used as a cover stock. A more preferred range is from about 0.05% to about 0.25% with the most preferred range from about 0.10% to about .020% depending on the optical properties of the particular optical brightener used and the polymeric environment in which it is a part.

Generally, the additives are admixed with a ionomer to be used in the cover composition to provide a masterbatch (M.B.) of desired concentration and an amount of the masterbatch sufficient to provide the desired amounts of additive is then admixed with the copolymer blends.

The cover compositions of the present invention may be produced according to conventional melt blending procedures. In this regard, the ionomeric resins are blended along with the masterbatch containing the desired additives in a Banbury type mixer, two-roll mill, or extruded prior to molding. The blended composition is then formed into slabs or pellets, etc. and maintained in such a state until molding is desired. Alternatively a simple dry blend of the pelletized or granulated resins and color masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process.

Moreover, golf balls of the present invention can be produced by molding processes currently well known in the golf ball art. Specifically, the golf balls can be produced by injection molding or compression molding the novel cover compositions about wound or solid molded cores to produce a golf ball having a diameter of about 1.680 inches or greater and weighing about 1.620 ounces. The standards for both the diameter and weight of the balls are established by the United States Golf Association (U.S.G.A.). Although both solid core and wound cores can be utilized in the present invention, as a result of their lower cost and superior performance, solid molded cores are preferred over wound cores.

Conventional solid cores are typically compression molded from a slug of uncured or lightly cured elastomer composition comprising a high cis: content polybutadiene and a metal salt of an α, β, ethylenically unsaturated carboxylic acid such as zinc mono or diacrylate or methacrylate. To achieve higher coefficients of restitution in the core, the manufacturer may include a small amount of a metal oxide such as zinc oxide. In addition, larger amounts of metal oxide than those that are needed to achieve the desired coefficient may be included in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiator catalysts such as peroxides are admixed with the core composition so that on the application of heat and pressure, a complex curing or cross-linking reaction takes place.

The term "solid cores" as used herein refers not only to one piece cores but also to those cores having a separate solid layer beneath the cover and above the core as in U.S. Pat. No. 4,431,193, and other multilayer and/or non-wound cores (such as those described in U.S. Pat. No. 4,848,770).

Wound cores are generally produced by winding a very large elastic thread around a solid or liquid filled balloon center. The elastic thread is wound around the center to produce a finished core of about 1.4 to 1.6 inches in diameter, generally. Since the-core material is not an integral part of the present invention, a detailed discussion concerning the specific types of core materials which may be utilized with the cover compositions of the invention are not specifically set forth herein. In this regard, the cover compositions of the invention may be used in conjunction with any standard golf ball core.

As indicated, the golf balls of the present invention may be produced by forming covers consisting of the compositions of the invention around cores by conventional molding processes. For example, in compression molding, the cover composition is formed via injection at about 380° F. to about 450° F. into smooth surfaced hemispherical shells which are then positioned around the core in a dimpled golf ball mold and subjected to compression molding at 200–300° F. for 2–10 minutes, followed by cooling at 50–70° F. for 2–10 minutes, to fuse the shells together to form an unitary ball. In addition, the golf balls may be produced by injection molding, wherein the cover composition is injected directly around the core placed in the center of a golf ball mold for a period of time at a mold temperature of from 50° F. to about 100° F. After molding the golf balls produced may undergo various further finishing steps such as buffing, painting, and marking as disclosed in U.S. Pat. No. 4,911, 451.

The present invention is further illustrated by the following examples in which the parts of the specific ingredients are by weight (pbw). It is to be understood that the present invention is not limited to the examples, and various changes and modifications may be made in the invention without departing from the spirit and scope thereof.

EXAMPLES

By blending the ingredients set forth in the Tables below, a series of golf ball cover formulations were produced. Finished golf balls were prepared using the cover compositions of the present invention, controls and comparative cover compositions by positioning a solid preformed crosslinked polybutadiene core in an injection molding cavity in such a manner to permit the uniform injection of the selected cover composition over each core. Along this line, the cover formulations were injection molded at about 400° F. around identical solid type cores having a finished diameter of 1.545 inches to produce golf balls approximately 1.680 inches in diameter having a normal cover thickness of 0.0675 inches. All materials were molded under essentially identical conditions. The properties of coefficient of restitution (C.O.R.) of the molded and finished balls, Shore D hardness, cold crack resistance, spin rates, etc. for the cover compositions were then determined.

In conducting the comparative prior art testing, Escor® 4000/7030, 7010 and Escor® 900/8000 ionomers were utilized. In this regard, blends of Escor® 4000/7030 and Escor® 900/8000 (i.e. the subject of U.S. Pat. No. 4,911, 451) are considered by the inventors to be generally among the best prior art cover compositions concerning ethyleneacrylic acid ionomer (low acid) blends.

The data for each example represents the average data for one dozen balls produced according to the desired manner. The properties for the Examples were measured according to the following parameters:

Coefficient of restitution (C.O.R.) was measured by firing the resulting golf ball in an air cannon at a velocity of 125 feet per second against a steel plate which is positioned 12 feet from the muzzle of the cannon. The rebound velocity was then measured. The rebound velocity was divided by the forward velocity to give the coefficient of restitution.

Shore hardness was measured in accordance with ASTM Test D-2240.

Cold cracking resistance was measured by firing balls from an air cannon, 5 blows at 165 feet/sec, after the balls had been conditioned for 24 hours at −10° F. After allowing the balls to equilibrate to room temperature the balls are inspected for cover cracking.

The spin rate of the golf ball was measured by striking the resulting golf balls with a pitching wedge or 9-iron wherein the club-head speed is about 80 feet per second and the ball is launched at an angle of 26 to 34 degrees with an initial velocity of about 110–115 feet per second. The spin rate was measured by observing the rotation of the ball in flight using stop action Strobe photography.

Example 1

Preparation of Acrylic Acid Based High Acid Ionomers

A number of new cation neutralized acrylic acid based high acid ionomer resins were prepared utilizing as the copolymer of an olefin and an alpha, beta-unsaturated carboxylic acid, a 20 weight percent acrylic acid/ethylene copolymer produced by The Dow Chemical Company, Midland, Mich. under the designation "Primacor 5981." According to The Dow Chemical Company, Primacor 5981 has a melt index (at 190° C., 2150 g) of 300 g/10 min. The carboxylic acid groups present in the 20 weight percent acrylic acid/ethylene copolymer were neutralized to various weight percentages by a number of different metal cation salts resulting in the production of several new thermoplastic elastomers exhibiting enhanced properties for golf ball cover production. Due to differences in the nature of the cation salts, the amount of cation salts utilized, etc., the new high acid ionomer resins produced differed substantially in the extent of neutralization and in melt indices, as well as in resilience (i.e. C.O.R.) and hardness values.

For the purpose of determining the weight percent of neutralization of the carboxylic acid groups in the acrylic acid/ethylene copolymer after reacting with various cation salts, it was assumed that 1 mole of sodium ($Na^+$), potassium ($K^+$), and lithium ($Li^+$) neutralized one mole of acrylic acid, and that one mole of zinc ($Zn^{2+}$), magnesium ($Mg^{2+}$), manganese ($Mn^{2+}$), calcium ($Ca^{2+}$) and nickel ($Ni^{2+}$) neutralized two moles of acrylic acid. The calculations of neutralization were based upon an acrylic acid molecular weight of 79 g/m, giving 0.2778 moles per 100 grams of copolymer.

As indicated below in Table 18, the various cation salts were added in variable amounts to the 20 weight percent acrylic acid/ethylene copolymer in order to determine the optimal level of neutralization for each of the cations. In Table 18, NaOH refers to sodium hydroxide (formula weight of 40). MnAc refers to manganese acetate tetrahydrate having a formula weight of 245. LiOH is lithium hydroxide, fwt=24. KOH is potassium hydroxide, fwt=56. ZnAc is zinc acetate dihydrate, fwt=219.5. MgAc is magnesium acetate tetrahydrate, fwt=214.4. CaAc is calcium acetate, fwt=158. MgO is magnesium oxide, fwt=40.3. NiAc is nickel acetate, fwt=176.8. All of these cation salts are solids at room temperature.

The specific cation salts were added in differing amounts with the 20 weight percent acrylic acid/ethylene copolymer (i.e. the Primacor 5981) to an internal mixer (Banbury type) for the neutralization reaction. The only exception was calcium acetate, which, due to problems encountered in solid form, was added as a 30 wt-% solution in water.

In the neutralization reaction, the cation salts solubilized in the Primacor 5981 acrylic acid/ethylene copolymer above the melting point of the copolymer and a vigorous reaction took place with a great deal of foaming occurring as the cation reacted with the carboxylic acid groups of the acrylic acid/ethylene copolymer and the volatile by-products of water (in the case of oxides or hydroxides) or acetic acid (when acetates are used) were evaporated. The reaction was continued until foaming ceased (i.e. about 30–45 minutes at 250–350° F.), and the batch was removed from the Banbury mixer. Mixing continued of the batch obtained from the mixer on a hot two-roll mill (175–250° F.) to complete the neutralization reaction. The extent of the reaction was monitored by measuring melt flow index according to ASTM D-1238-E. As indicated below, the neutralized products exhibited drastically different properties depending upon the nature and amount of the cation salts utilized.

TABLE 18

| Formulation No. | Wt-% Cation Salt | Wt-% Neutralization | Melt Index | C.O.R. | Shore D Hardness |
|---|---|---|---|---|---|
| 1(NaOH) | 6.98 | 67.5 | 0.9 | .804 | 71 |
| 2(NaOH) | 5.66 | 54.0 | 2.4 | .808 | 73 |
| 3(NaOH) | 3.84 | 35.9 | 12.2 | .812 | 69 |
| 4(NaOH) | 2.91 | 27.0 | 17.5 | .812 | (brittle( |
| 5(MnAc) | 19.6 | 71.7 | 7.5 | .809 | 73 |
| 6(MnAc) | 23.1 | 88.3 | 3.5 | .814 | 77 |
| 7(MnAc) | 15.3 | 53.0 | 7.5 | .810 | 72 |
| 8(MnAc) | 26.5 | 106 | 0.7 | .813 | (brittle) |
| 9(LiOH) | 4.54 | 71.3 | 0.6 | .810 | 74 |
| 10(LiOH) | 3.38 | 52.5 | 4.2 | .818 | 72 |
| 11(LiOH) | 2.34 | 35.9 | 18.6 | .815 | 72 |
| 12(KOH) | 5.30 | 36.0 | 19.3 | Broke | 70 |
| 13(KOH) | 8.26 | 57.9 | 7.18 | .804 | 70 |
| 14(KOH) | 10.7 | 77.0 | 4.3 | .801 | 67 |
| 15(ZnAc) | 17.9 | 71.5 | 0.2 | .806 | 71 |
| 16(ZnAc) | 13.9 | 53.0 | 0.9 | .797 | 69 |
| 17(ZnAc) | 9.91 | 36.1 | 3.4 | .793 | 67 |
| 18(MgAc) | 17.4 | 70.7 | 2.8 | .814 | 74 |
| 19(MgAc) | 20.6 | 87.1 | 1.5 | .815 | 76 |
| 20(MgAc) | 13.8 | 53.8 | 4.1 | .814 | 74 |
| 21(CaAc) | 13.2 | 69.2 | 1.1 | .813 | 74 |
| 22(CaAc) | 7.12 | 34.9 | 10.1 | .808 | 70 |
| 23(MgO) | 2.91 | 53.5 | 2.5 | .813 | |
| 24(MgO) | 3.85 | 71.5 | 2.8 | .808 | |
| 25(MgO) | 4.76 | 89.3 | 1.1 | .809 | |
| 26(MgO) | 1.96 | 35.7 | 7.5 | .815 | |
| 27(NiAc) | 13.04 | 61.1 | 0.2 | .802 | 71 |
| 28(NiAc) | 10.71 | 48.9 | 0.5 | .799 | 72 |
| 29(NiAc) | 8.26 | 36.7 | 1.8 | .796 | 69 |
| 30(NiAc) | 5.66 | 24.4 | 7.5 | .786 | 64 |

Controls: 50/50 Blend of Iotak ™ 8000/7030 C.O.R. = .810/65 Shore D Hardness
Dupont High Acid Surlyn ® 8422 (Na) C.O.R. = .811/70 Shore D Hardness
Dupont High Acid Surlyn ® 8162 (Zn) C.O.R. = .807/65 Shore D Hardness
Exxon High Acid Iotek ™ EK-960 (Zn) C.O.R. = .796/65 Shore D Hardness
Control for Formulations 23–26 is 50/50 Iotek ™ 8000/7030,
C.O.R. = .814, Formulation 26 C.O.R. was normalized to that control accordingly
Control for Formulation Nos. 27–30 is 50/50 Iotek ™ 8000/7030, C.O.R. = .807

As indicated in Table 18, a number of the new cation neutralized acrylic acid based high acid ionomer resins exhibited C.O.R. and Shore D hardness values greater than that exhibited by a 50/50 blend of the Iotek™ low acid acrylic acid based hard ionomer resins, such as the Iotek™ 8000/7030 blend utilized in the cover compositions disclosed in U.S. Pat. No. 4,911,451. Moreover, included in new acrylic acid based high acid ionomer resins were numerous cation neutralized high acid ionomer resins previously not available, such as those acrylic acid based high acid ionomer resins neutralized to various degrees by the manganese, lithium, potassium, magnesium, calcium and nickel salts. Furthermore, the new cation neutralized acrylic acid based high acid ionomers produced C.O.R. and hardness values greater than those shown by the methacrylic acid based high acid ionomer resins recently produced by DuPont (i.e. Surlyn® 8422 (Na) and Surlyn® 8162 (Zn)) and the acrylic acid based high acid resins experimentally produced by Exxon (i.e. Iotek™ EX-959 and Ex-960 (Zn)), collectively referred to as "the controls."

In addition, the results produced by Formulation Nos. 1 through 3 directed to the sodium ion neutralized ethylene-acrylic acid copolymers and Formulation Nos. 15 through 17 directed to the zinc ion neutralized ethylene-acrylic acid copolymers in comparison to the new Iotek™ high acid ethylene acrylic acid ionomers were also of interest. As indicated above, Escor® or Iotek™ Ex-959 is a sodium ion neutralized ethylene-acrylic acid copolymer and Escor® or Iotek™ Ex-960 is a zinc neutralized ethylene-acrylic acid copolymer. According to Exxon, Iotek™s 959 and 960 contain from about 19.0 to about 21.0% by weight acrylic acid with approximately 30 to about 70 percent of the acid groups neutralized with sodium and zinc ions, respectfully.

Formulation No. 2 (i.e. 5.66 wt-% sodium salt, 54 wt-% neutralization, 2.4 melt index, 0.808 C.O.R. and 73 Shore D hardness) is somewhat similar to Iotek™ 959 and Formulation No. 16 (i.e. 13.9 wt-% zinc salt, 53 wt-% neutralization, 0.9 melt index, 0.797 C.O.R. and 69 Shore D hardness) is somewhat similar to Iotek™ 960.

However, not only did the new cation neutralized acrylic acid based high acid ionomers exhibit similar or better resilience (C.O.R.) at comparable or better hardness values than those exhibited by the sodium or zinc high acid Iotek™ ionomers, as a result of the neutralization of the acrylic acid/ethylene cop olymer with several different cation salts, to a number of different neutralization percentages, a wide variety of new cation neutralized acrylic acid based high acid ionomers were produced having improved resilience and hardness values. These new cation neutralized high acid ionomer resins are particularly valuable in the field of golf ball production.

More particularly, the development of a number of separate different cation neutralized high acid ionomers besides the sodium or zinc high acid ionomers available from DuPont or Exxon, such as the new manganese, lithium, potassium, magnesium, calcium and nickel acrylic acid based high acid ionomer resins, allows for the production of a wide variety of cation neutralized high acid ionomer blends. Furthermore, since the new sodium or zinc neutralized high acid ionomers produced improved properties over those produced by the existing available sodium or zinc high acid ionomers, a number of new cover compositions can be produced having enhanced characteristics.

Along this line, several of the cation neutralized acrylic acid based high acid ionomer resins produced above which exhibited enhanced C.O.R. and Shore D hardness values were blended together and evaluated for the purpose of determining whether any synergistic effects were produced particularly with respect to enhanced C.O.R. values.

Specifically, from each group of the different cation neutralized high acid ionomer resins set forth in Table 18, the best overall ionomer (based upon C.O.R., melt index and Shore D hardness) was utilized to produce a number of blends ("diblends" and "triblends") and processed to produce the cover component of multi-layered golf balls. The "diblends" consisted of 50/50 mixtures and the "triblends" consisted of a 33.33/33.33/33.33 mixtures.

With respect to the blends set forth below, Na refers to Formulation No. 3, C.O.R. (molded/finished) of 0.812/817; Mn refers to Formulation No. 6, C.O.R. (molded/finished) of 0.814/0.814; Li refers to Formulation No. 10, C.O.R. (molded/finished) of 0.818/0.819; K refers to Formulation No. 13, C.O.R. (molded/finished) of 0.805/0.809, Zn refers to Formulation No. 16, C.O.R. (molded/finished) of 0.797/0.796; Mg refers to Formulation No. 18, C.O.R. (molded/finished) of 0.814/0.820; Ca refers to Formulation No. 21, C.O.R. (molded/finished) of 0.813/0.812; Ni refers to Formulation No. 28, C.O.R. (molded/finished) of 0.799/0.817; and 50/50 Iotek™ 8000/7030 refers to control of 50/50 blend of Iotek™ 8000/7030, C.O.R. (molded/finished) of 0.810/0.812. The C.O.R. values of the "diblends" and "triblends" were then evaluated after molding with a center stock having the following composition:

TABLE 19

| MATERIAL | WEIGHT (phr) |
|---|---|
| BR-1220[1] | 70.70 |
| Taktene 220[2] | 29.30 |
| React Rite ZDA[3] | 31.14 |
| Zinc Oxide | 6.23 |
| Zinc Stearate | 20.15 |
| Limestone | 17.58 |
| Ground Flash (20–40 mesh) | 20.15 |
| Blue Masterbatch | .012 |
| Luperco 231XL[4] | .89 |
| or Trigonox 29/40[5] | |
| Papi 94[6] | .50 |

[1] BR-1220 is high cis-polybutadiene from Shell Chemical Co., Houston Texas.
[2] Taktene is high cis-polybutadiene from Polysar Chemical.
[3] ZDA is zinc diacrylate.
[4] Luperco 231XL is a peroxide-free radical initiator manufactured and sold by Atochem, Buffalo, New York.
[5] Trigonox 29/40 is peroxide-free radical initiator manufactured and sold by Akzo Chemie America, Chicago, Illinois.
[6] Papi 94 is a polymeric diisocyanate available from Dow Chemical Co., Midland, Michigan.

In addition, the molded balls were coated and finished according to the procedure mentioned above. The C.O.R. values of the finished balls were determined in order to evaluate whether any improvement in resilience was produced. Generally, it is typical to observe a 0.002 to 0.003 point pick up in C.O.R. values of the finished balls in comparison to the molded balls. The results are set forth in Tables 20A, 20B and 21 below.

TABLE 20A

Diblends (50/50 Blends) C.O.R. (Molded/Finished) Values

| Formulation No. | Blend | C.O.R. (Molded/Finished) |
|---|---|---|
| 31 | Na/Mn | .813/.818 |
| 32 | Na/Li | .813/.818 |
| 33 | Na/K | .809/.816 |
| 34 | Na/Zn | .811/.818 |
| 35 | Na/Mg | .813/.819 |
| 36 | Na/Ca | .811/.819 |
| 37 | Mn/Li | .811/.817 |
| 38 | Mn/K | .811/.818 |
| 39 | Mn/Zn | .807/.814 |
| 40 | Mn/Mg | .809/.816 |
| 41 | Mn/Ca | .809/.816 |
| 42 | Li/K | .810/.817 |
| 43 | Li/Zn | .813/.819 |
| 44 | Li/Mg | .812/.820 |
| 45 | Li/Ca | .811/.818 |
| 46 | K/Zn | .810/.815 |
| 47 | K/Mg | .811/.820 |
| 48 | K/Ca | .810/.817 |
| 49 | Zn/Mg | .807/.814 |
| 50 | Zn/Ca | .808/.814 |
| 51 | Mg/Ca | .801/.818 |
| 52 | Na/Ni | .809/.815 |
| 53 | Mn/Ni | .807/.814 |
| 54 | Li/Ni | .809/.816 |
| 55 | K/Ni | .809/.816 |
| 56 | Zn/Ni | .799/.804 |
| 57 | Mg/Ni | .805/.813 |
| 58 | Ca/Ni | .807/.815 |
| 59 | Iotek ™ 959/960 | .811/.818 |
| 60 | Control | .809/NA |
| 61 | Control | .806/NA |

Controls are Formulation No. 59, a 50/50 blend of Iotek ™ 959/960; Formulation No. 60 a 75/25 blend of Surlyn ® 8162/8422; and Formulation No. 61 a 50/50 blend of Iotek ™ 8000/7030.

TABLE 20B

Synergy Values of the DiBlends

| Formulation No. | Salt 1 | Salt 2 | (COR) calc | (COR) exp | (COR) exp − (COR) calc | Final (COR) calc | Final (COR) exp | Final (COR) Diff. |
|---|---|---|---|---|---|---|---|---|
| 31 | Na | Mn | 813.0 | 813.0 | 0.0 | 815.5 | 818.0 | 2.5 |
| 32 | Na | Li | 815.0 | 813.0 | −2.0 | 818.0 | 818.0 | 0.0 |
| 33 | Na | K | 808.0 | 809.0 | 1.0 | 813.0 | 816.0 | 3.0 |
| 34 | Na | Zn | 804.5 | 811.0 | 6.5 | 806.5 | 818.0 | 11.5 |
| 35 | Na | Mg | 813.0 | 813.0 | 0.0 | 818.5 | 819.0 | 0.5 |
| 36 | Na | Ca | 812.5 | 811.0 | −1.5 | 814.5 | 819.0 | 4.5 |
| 37 | Mn | Li | 816.0 | 811.0 | −5.0 | 816.5 | 817.0 | 0.5 |
| 38 | Mn | K | 809.0 | 811.0 | 2.0 | 811.5 | 818.0 | 6.5 |
| 39 | Mn | Zn | 805.5 | 807.0 | 1.5 | 805.0 | 814.0 | 9.0 |
| 40 | Mn | Mg | 814.0 | 809.0 | −5.0 | 817.0 | 816.0 | −1.0 |
| 41 | Mn | Ca | 813.5 | 809.0 | −4.5 | 813.0 | 816.0 | 3.0 |
| 42 | Li | K | 811.0 | 810.0 | −1.0 | 814.0 | 817.0 | 3.0 |
| 43 | Li | Zn | 807.5 | 813.0 | 5.5 | 807.5 | 819.0 | 11.5 |
| 44 | Li | Mg | 816.0 | 812.0 | −4.0 | 819.5 | 820.0 | 0.5 |
| 45 | Li | Ca | 815.5 | 811.0 | −4.5 | 815.5 | 818.0 | 2.5 |
| 46 | K | Zn | 800.5 | 810.0 | 9.5 | 802.5 | 815.0 | 12.5 |
| 47 | K | Mg | 809.0 | 811.0 | 2.0 | 814.5 | 820.0 | 5.5 |
| 48 | K | Ca | 806.0 | 810.0 | 4.0 | 810.5 | 817.0 | 6.5 |
| 49 | Zn | Mg | 805.5 | 807.0 | 1.5 | 808.0 | 814.0 | 6.0 |
| 50 | Zn | Ca | 805.0 | 808.0 | 3.0 | 804.0 | 814.0 | 10.0 |
| 51 | Mg | Ca | 813.5 | 810.0 | −3.5 | 816.0 | 818.0 | 2.0 |
| 52 | Na | Ni | 805.5 | 809.0 | 3.5 | 817.0 | 815.0 | −2.0 |
| 53 | Mn | Ni | 806.5 | 807.0 | 0.5 | 815.5 | 814.0 | −1.5 |
| 54 | Li | Ni | 808.5 | 809.0 | 0.5 | 818.0 | 816.0 | −2.0 |
| 55 | K | Ni | 801.5 | 809.0 | 7.5 | 813.0 | 816.0 | 3.0 |
| 56 | Zn | Ni | 798.0 | 799.0 | 1.0 | 806.5 | 804.0 | −2.5 |

TABLE 20B-continued

Synergy Values of the DiBlends

| Formulation No. | Salt 1 | Salt 2 | (COR) calc | (COR) exp | (COR) exp – (COR) calc | Final (COR) calc | Final (COR) exp | Final (COR) Diff. |
|---|---|---|---|---|---|---|---|---|
| 57 | Mg | Ni | 806.5 | 805.0 | –1.5 | 818.5 | 813.0 | –5.5 |
| 58 | Ca | Ni | 806.0 | 807.0 | 1.0 | 814.5 | 815.0 | 0.5 |

In Table 20B above, the C.O.R. synergy values are based upon the data from Table 18 of the various metal cation neutralized high acid acrylic acid based ionomer resins and the following calculations:

(COR)calc=coefficient calculated as weighted average of as-molded

COR's for polymers of salts 1 and 2

(COR) exp=experimental as-molded COR for blend

FINAL (COR)calc=coefficient calculated as weighted average of finished COR's for polymers of salts 1 and 2

FINAL (COR) exp=experimental finished COR for blend

FINAL (COR) diff=difference between FINAL (COR) exp and

FINAL (COR) (calc)

As noted in Table 20B, positive synergy in resilience is observed for nearly all of the finished (final) blends, with substantial synergy being produced in Formulation Nos. 34, 38, 39, 43, 46, 48, 49, 50.

Moreover, the diblends were also evaluated against a control Formulation No. 59 (see Table 20A), a 50/50 blend of Iotek™ 959/960, the best available high acid blends, with respect to improved C.O.R. values (i.e. 811/0.818). Similar or enhanced C.O.R. values (molded/finished) were observed in Formulation Nos. 31 (Na/Mn), 32 (Na/Li), 34 (Na/Zn), 35 (Na/Mg), 36 (Na/Ca), 38 (Mn/K), 43 (Li/Zn), 44 (Li/Mg), 45 (Li/Ca), and 47 (K/Mg).

Furthermore, when reviewed for cold cracking, with the exception of Formulation No. 35, all of the diblends tested exhibited resistance to breaking. With respect to Formulation No. 35, some breakage did occur with 2 out of the 12 balls tested exhibiting breakage.

When the small test sample of the triblends were evaluated (see Table 21 below) in comparison to a 50/50 blends of the low acid acrylic acid based hard ionomers (i.e. Iotek™ 8000/7030 U.S. Pat. No. 4,911,451), all of the cation neutralized high acid acrylic acid based triblends produced enhanced C.O.R. values upon molding and finishing. In addition, when subjected to cold cracking, no breakages were observed.

TABLE 21

| Formulation | Cation Blend | C.O.R. Molded | C.O.R. Finished Ball |
|---|---|---|---|
| 62 | Zn/Li/K | .819 | .828 |
| 63 | Na/Zn/Li | .821 | .829 |
| 64 | Iotek™ 8000/7030 | .816 | .819 |
| 65 | Na/Mn/Ca | .820 | .828 |
| 66 | Na/K/Mn | .821 | .829 |
| 67 | Na/K/Mg | .821 | .829 |

Consequently, not only are a number of new cation neutralized acrylic acid based high acid ionomers now available for golf ball cover construction, these new cation neutralized acrylic acid based high acid ionomers may be blended together in various combinations to produce cover compositions exhibiting enhanced resilience (i.e. distance) due to the synergies noted above.

Example 2

In order to determine whether the diblends or triblends of the new cation neutralized acrylic acid based high acid ionomer resins produced different results when dry blended (id based (i.e. as simple dry blends of pre-made single cation neutralized acrylic acid based a ionomers, such as those set forth in Example 1 above) or when produced as "in-situ" cation blends (i.e. the cations were first blended and then added to the acrylic acid/ethylene copolymers in the Banbury mixer), a number of comparison reactions were gene rated. Specifically, in-situ Formulation Nos. 68–72 in Table 22 below correspond to dry-blended Formulation Nos. 31, 32, 43, 44 and 46, respectively, and in-situ Formulation Nos. 73 and 74 in Table 22 below correspond to dry-blended Formulation Nos. 62 and 63, respectively.

TABLE 22

| Formulation No. | Cation Blend | C.O.R Molded | C.O.R. Finished | Spin Rate 9-Iron, RPM | Shore D Hardness |
|---|---|---|---|---|---|
| 68 | Na/Mn | .822 | .828 | 5,008 | 74 |
| 69 | Na/Li | .820 | .828 | 5,820 | 70 |
| 70 | Li/Zn | .820 | .825 | 5,425 | 71 |
| 71 | Li/Mg | .821 | .828 | 5,451 | 73 |
| 72 | Zn/K | .817 | .821 | 5,934 | 69 |
| 73 | Li/Zn/K | .822 | .826 | 5,266 | 71 |
| 74 | Na/Li/Zn | .821 | .824 | 5,165 | 71 |
| 75 | Iotek™ 959 (Na)/ 960 (Zn) | .819 | .824 | 5,926 | |
| Tour Edition ® 100 | | | | 10,124 | |
| Tour Edition ® 90 | | | | 9,821 | |
| Top-Flite ® XL II | | | | 6,942 | |

The results indicated that little difference in C.O.R. was produced (relative to a control of 50/50 mixture of the high acid Iotek™ 959/960) whether a dry blending process or an in-situ blending process was used. Moreover, the data further clearly indicated that the cation neutralized acrylic acid based high acid ionomer blends of the present invention generally exhibit higher C.O.R. values and significantly lower spin rates than the best acrylic acid based high acid ionomers (i.e. the Iotek™s 959(Na)/960(Zn) blend), see Formulation Nos. 68, 70, 71, 73 and 74 in comparison to Formulation No. 75 (control). The lower C.O.R. value and the substantially similar spin rate produced by the Zn/K blend in Formulation 72 was attributed to the slightly lower hardness of this blend versus the others. As indicated in Table 18, the K and Zn acrylic acid based high acid ionomers are a little softer than the Na, Mn, Li and Mg acrylic acid based high acid ionomers. Similarly, the higher spin rate of the Na/Li blend in Formulation 69 was due to its relative softness versus the other blends. In addition, other more subtle factors may also be at play, such as differences in coefficient of friction, deformation under load, etc., which have not quantified.

In addition, when compared with a number of commercially available balls produced by Spalding & Evenflo Companies, Inc., the assignee/licensee of the present invention, with low acid ionomer resin covers (i.e. the Tour Edition® 100, Tour Edition® 90 and Top-Flite® XL II balls), the spin rates of the cation neutralized acrylic acid high acid ionomer blends of the present invention (i.e. Formulations 68–75) exhibited much lower spin rates. Consequently, the cation neutralized acrylic acid based high acid ionomer blends of the present invention produced, when utilized to formulate the cover of a multi-layered golf ball, a much harder surface then those produced by the low acid ionomer covers presently available. This may be desirable to a golfer who imparts unmanageable spin (slice/hook) to the ball and therefore may benefit from a "low spin" ball.

Example 3

Acrylic Acid Based High Acid Ionomer

Di-Blends Containing Varying Ratios of Cation Neutralized

Acrylic Acid Based High Acid Ionomers

In addition to the 50/50 blends of various combinations of the new cation neutralized acrylic acid based high acid ionomers set forth in Example 1, di-blends varying from 25/75 to 75/25 ratios were produced utilizing the more preferred diblends in the "in-situ" process described in Example 2. In this regard, the more preferred diblend formulations set forth in Example 1 (i.e. Formulation No. 31 (Na/Mn), Formulation No. 32 (Na/Li), Formulation 43 (Li/Zn), Formulation No. 44 (Li/Mg), and Formulation No. 46 (Zn/K)) were produced in-situ in 50/50, 25/75 and 75/25 combinations according to the following formulations:

The di-blends produced the following C.O.R. values:

TABLE 24

| Formulation No. | Cation Blend | C.O.R. (Molded) |
| --- | --- | --- |
| 76 | 50/50 Na/Mn | .820 |
| 77 | 25/75 Na/Mn | .821 |
| 78 | 75/25 Na/Mn | .825 |
| 79 | 50/50 Na/Li | .822 |
| 80 | 25/75 Na/Li | .822 |
| 81 | 75/25 Na/Li | .823 |
| 82 | 50/50 Li/Zn | .816 |
| 83 | 25/75 Li/Zn | .804 |
| 84 | 75/25 Li/Zn | .825 |
| 85 | 50/50 Li/Mg | .823 |
| 86 | 25/75 Li/Mg | .822 |
| 87 | 75/25 Li/Mg | .821 |
| 88 | 50/50 Zn/K | .820 |
| 89 | 75/25 Zn/K | .798 |
| 90 | 25/75 Zn/K | .821 |

Control is a 50/50 Iotek ™ Low Acid Ionomer Blend (8000/7030), C.O.R. (molded) .817

The results indicated that in general the new cation neutralized acrylic acid based high acid ionomer diblends produced enhanced C.O.R. values over the known acrylic acid based low acid ionomer blends. See Formulation Nos. 76–81, 84–88 and 90. While Formulation 82 produced a lower C.O.R. value than expected, the data suggested that in some cases, a 50/50 blend is not optimal (particularly in the Zn/K and the Li/Zn blends), while in others (i.e. Li/Mg, Na/Li) the blend ratio is not significantly different.

Example 4

Since the data set forth in Examples 1–3 indicated the resilience (C.O.R.) and/or hardness properties of the cover compositions can be substantially enhanced through the use of the new cation neutralized acrylic acid based high acid ionomers and/or diblends or triblends of such ionomers, the molecular weight property of the acrylic acid/ethylene copolymers utilized to produce the ionomers was evaluated. Specifically, the molecular weight of the acid copolymers

TABLE 23

| | Formulations | | | | | | | | | |
| --- | --- | --- | --- | --- | --- | --- | --- | --- | --- | --- |
| Ingredients | 76 | 77 | 78 | 79 | 80 | 81 | 82 | 83 | 84 | 85 |
| Acid Copolymer (Primacor 5981) | 100 | 100 | 100 | 100 | 100 | 100 | 100 | 100 | 100 | 100 |
| NaOH | 2.0 | 1.0 | 3.0 | 2.0 | 1.0 | 3.0 | — | — | — | — |
| Mn Acetate | 15.0 | 22.5 | 7.5 | — | — | — | — | — | — | — |
| Lithium Hydroxide Monohydrate | — | — | — | 3.1 | 4.7 | 1.6 | 3.1 | 1.6 | 4.7 | 3.1 |
| Zinc Acetate | — | — | — | — | — | — | 8.00 | 12.0 | 4.0 | — |
| Potassium Hydroxide | — | — | — | — | — | — | — | — | — | — |
| Magnesium Acetate | — | — | — | — | — | — | — | — | — | 10.5 |

| | Formulation No. | | | | |
| --- | --- | --- | --- | --- | --- |
| Ingredients | 86 | 87 | 88 | 89 | 90 |
| Primacor 5981 | 100 | 100 | 100 | 100 | 100 |
| Lithium Hydroxide | 1.6 | 4.7 | — | — | — |
| Magnesium Acetate | 15.8 | 5.3 | — | — | — |
| Zinc Acetate | — | — | 8.00 | 12.0 | 4.0 |
| Potassium Hydroxide | — | — | 4.50 | 2.25 | 6.75 | was assessed for the purpose of determining whether further enhanced properties can be produced by varying the molecular weight of the acid copolymer.

In this regard, since the data indicated that there was little difference between using the dry blending process or the in-situ blending method for processing the cations, the in-situ method of producing the cation neutralized high acid ionomer blends was used in this analysis.

Along this line, the diblend and triblends set forth in Formulation Nos. 68, 73 and 74 are essentially the same as those set forth below in Formulation Nos. 91, 94 and 97, respectively. However, since a different batch of cores was utilized than those used in Example 2, the C.O.R.'s are slightly lower. While the cores utilized in the present Example were of the same composition, the lower C.O.R. was due to the age of the cores, i.e. molded cores will lose C.O.R. upon aging mainly due to moisture pickup. Formulation Nos. 92–93, 95–96 and 98–99, are similar to those set forth in Formulation Nos. 91, 94 and 97, respectively, with the exception that the molecular weight of the acrylic acid/ethylene copolymer utilized was varied. Specifically, Primacor 5983 and Primacor 5990 both contain the same acid content as Primacor 5981 (i.e. 20 weight percent acrylic acid) but have lower viscosities (lower molecular weights) and lower densities. Primacor 5981 has a melt index of 300 g/10 minute (ASTM Method D-1238 at 190° C.) and a Brookfield viscosity of 51,000 cps at 350° F. Primacor 5983 has a melt index of 500 and a Brookfield viscosity of 26,000 cps at 350° F.; and Primacor 5990 has a melt index of 1300 and viscosity of 13,000 cps at 350° F.

The resilience (C.O.R.) of the molded balls produced utilizing the different molecular weight acrylic acid/ethylene copolymers are set forth below in Table 25.

TABLE 25

| Formulation No. | Cations | Acid Copolymer | C.O.R. (MOLDED) |
|---|---|---|---|
| 91 | Na/Mn | Primacor 5981 | .813 |
| 92 | Na/Mn | Primacor 5983 | .805 |
| 93 | Na/Mn | Primacor 5990 | All Balls crack |

TABLE 25-continued

| Formulation No. | Cations | Acid Copolymer | C.O.R. (MOLDED) |
|---|---|---|---|
| 94 | Li/Zn/K | Primacor 5981 | .814 |
| 95 | Li/Zn/K | Primacor 5983 | .809 |
| 96 | Li/Zn/K | Primacor 5990 | All Balls crack |
| 97 | Na/Li/Zn | Primacor 5981 | .813 |
| 98 | Na/Li/Zn | Primacor 5983 | .808 |
| 99 | Na/Li/Zn | Primacor 5990 | All Balls crack |

The data indicated that a higher molecular weight acid copolymer is preferred for obtaining high resilience (i.e. C.O.R.) and required toughness.

Example 5

By way of further example, golf ball cover compositions were prepared by first blending an acid copolymer such as ethylene acrylic acid copolymer (EAA) with a non-acid functional ethylene alkyl acrylate copolymer such as ethylene-ethyl acrylate (EEA) and/or ethylene-methyl acrylate (EMA). This was followed by addition of a metal cation salt or blend thereof for neutralization. In this co-neutralization process the acid groups of the ethylene acrylic acid copolymer (EAA) were converted by neutralization to form a salt of the acid (or ionomer) and water. In turn, the carboxylic acid esters of the ethylene alkyl acrylate copolymer were converted by alkaline hydrolysis to form a salt of the acid (or cation neutralized ester-based ionomer) and alcohol. Selection of the type and ratio of acid copolymer to EEA or EMA was based upon the desired final properties of the ball such as hardness or spin rate. Tables 26–28 show the compositions and properties of balls having covers prepared using ethylene acrylates, and Table 29 shows the properties of several golf balls produced by the present assignee/licensee which do not contain ethylene acrylates but exhibit somewhat similar properties.

Table 26 below provides for the results of simple blends of ionomers with various non-acid functional polymers. Iotek™ 959 and Iotek™ 960 were selected for their similarity in properties to ionomers made from Primacor 5981.

TABLE 26

| Formulation No. | 100 | 101 | 102 | 103 | 104 | 105 | 106 | 107 |
|---|---|---|---|---|---|---|---|---|
| Iotek ™ 959 | 50 | 25 | 25 | 25 | 25 | 25 | 25 | 25 |
| Iotek ™ 960 | 50 | 25 | 25 | 25 | 25 | 25 | 25 | 25 |
| Kraton FG-1901X | — | 50 | — | — | — | — | — | — |
| EEA 6169 | — | — | 50 | — | — | — | — | — |
| EEA 6182 | — | — | — | 50 | — | — | — | — |
| EMA 53.04 | — | — | — | — | 50 | — | — | — |
| EMA XS 12.04 | — | — | — | — | — | 50 | — | — |
| EMA TC-130 | — | — | — | — | — | — | 50 | — |
| Fusabond D-197 | — | — | — | — | — | — | — | 50 |
| Compression | 56 | 59 | 61 | 60 | 61 | 61 | 63 | 60 |
| Molded COR | .818 | .797* | .797 | .798 | .797 | .798 | .793* | .796 |
| Finished COR | .821 | .798 | .795 | .798 | .797 | .799 | .787 | .796 |
| Shore C Hardness | 98 | 85 | 86 | 88 | 80 | 85 | 80 | 88 |
| Cut Resistance | 4–5 | 3 | 2–3 | 2 | 2 | 2 | 2 | 2 |
| Spin Rate (full 9 iron) | 5,969 | 9,495 | 8,997 | 9,260 | 9,145 | 9,732 | 9,857 | 9,340 |

*Several balls cracked on Formulations 101 and 106 during COR testing.

Blends similar to those of Table 26 were prepared using Primacor 5981 as the acid copolymer of choice instead of Iotek™ 959/960. These blends, and the resulting properties, are set forth below in Table 27:

TABLE 27

| Formulation No. | 108 | 109 | 110 | 111 | 112 | 113 | 114 | 115 |
|---|---|---|---|---|---|---|---|---|
| Primacor 5981 | 100 | 50 | 50 | 50 | 50 | 50 | 50 | 50 |
| Nucrel 960 | — | — | — | — | — | — | — | — |
| Kraton FG-1901X | — | 50 | — | — | — | — | — | — |
| EEA 6169 | — | — | 50 | — | — | — | — | — |
| EEA 6182 | — | — | — | 50 | — | — | — | — |
| EMA 53.04 | — | — | — | — | 50 | — | — | — |
| EMA X512.04 | — | — | — | — | — | 50 | — | — |
| EMA TC-130 | — | — | — | — | — | — | 50 | — |
| Fusabond D-197 | — | — | — | — | — | — | — | 50 |
| Zinc Acetate | 5.33 | 5.33 | 5.33 | 5.33 | 5.33 | 5.33 | 5.33 | 5.33 |
| Potassium Hydroxide | 3.00 | 3.00 | 3.00 | 3.00 | 3.00 | 3.00 | 3.00 | 3.00 |
| Lithium Hydroxide | 2.05 | 2.05 | 2.05 | 2.05 | 2.05 | 2.05 | 2.05 | 2.05 |
| Compression | 55 | 62 | 60 | 60 | 63 | 63 | 62 | 62 |
| Molded COR | .820 | .802 | .792 | .794 | .791 | .790 | .793 | .802 |
| Finished COR | .825 | .802 | .792 | .796 | .793 | .790 | .794 | .801 |
| Shore C Hardness | 98 | 90 | 86 | 90 | 77 | 83 | 83 | 88 |
| Cut Resistance | 4–5 | 3 | 3 | 3 | 2 | 3 | 2 | 3–4 |
| Spin Rate (Full 9 Iron) | 5,787 | 8,834 | 9,232 | 9,148 | 10,220 | 9,516 | 9,552 | 9,091 |

While Primacor 5981 has been the acid copolymer of choice herein as a result of its high COR, it should be noted that lower acid copolymers or a blend of acid copolymers may be used with satisfactory results. Table 28 below shows several compositions using lower acid copolymers or a blend of acid copolymers, along with the resulting properties of the finished cover and ball.

TABLE 28

| Formulation No. | 116 | 117 | 118 | 119 | 120 |
|---|---|---|---|---|---|
| Primacor 5981 | — | — | — | 25 | — |
| Nucrel 960 | 50 | 50 | 50 | 25 | 100 |
| Kraton FG-1901X | — | — | — | — | — |
| EEA 6169 | — | — | — | — | — |
| EEA 6182 | 50 | — | — | — | — |
| EMA 53.04 | — | 50 | — | 50 | — |
| EMA X512.04 | — | — | — | — | — |
| EMA TC-130 | — | — | — | — | — |
| Fusabond D-197 | — | — | 50 | — | — |
| Zinc Acetate | 4.00 | 4.00 | 4.00 | 4.70 | 4.00 |
| Potassium Hydroxide | 2.27 | 2.27 | 2.27 | 2.60 | 2.27 |
| Lithium Hydroxide | 1.50 | 1.50 | 1.50 | 1.80 | 1.50 |
| Compression | 68 | 66 | 64 | 64 | 58 |
| Molded COR | .793 | .789 | .800 | .790 | .813 |
| Finished COR | .793 | .788 | .798 | .790 | .815 |
| Shore C Hardness | 86 | 75 | 88 | 76 | 96 |
| Cut Resistance | 3 | 3 | 3 | 3 | 4 |
| Spin Rate (Full 9 Iron) | 9,436 | 10,306 | 9,315 | 10,168 | 7,014 |

One of the objectives in preparing the formulations listed in Tables 26–28 was to make a soft covered golf ball having properties similar to the current "Tour" balls of the present assignee/licensee. The properties of the subject assignee's Titleist Tour 100, Tour Edition 100, Tour Edition 90, and Top-Flite XL II are provided in Table 29. These properties may be compared with those listed in Tables 26–28 to find many similarities such that a lower cost alternative may be provided.

TABLE 29

| | Titlesist Tour 100 | Tour Edition 100 | Tour Edition 90 | Top-Flite XL II |
|---|---|---|---|---|
| Compression | 75 | 57 | 55 | 47 |
| Molded COR | — | — | — | — |

TABLE 29-continued

|  | Titlesist Tour 100 | Tour Edition 100 | Tour Edition 90 | Top-Flite XL II |
|---|---|---|---|---|
| Finished COR | .786 | .809 | .813 | .814 |
| Shore C Hardness | 82 | 84 | 86 | 96 |
| Cut Resistance | 1 | 3 | 3 | 4–5 |
| Spin Rate (Full 9 Iron) | 9,422 | 9,924 | 9,703 | 6,968 |

Little is known of the reaction mechanism or to what extent the EEA and/or EMA actually take part in the reaction of EEA/EMA with an acid copolymer and the addition of a cation or cation blend for neutralization. There is, however, some belief that there is at least enough interaction between polymers to provide a net benefit in properties versus a simple blend of an ionomer and EEA/EMA. It is possible that an interpenetrating polymer network (IPN) or semi-interpenetrating network (SIPN) is formed by reacting (neutralizing) the acid copolymer in the presence of EEA/EMA. By first forming an intimate blend of polymers and then neutralizing one or both polymers in the presence of the other it is possible that a physical network is formed via intermolecular chain entanglement of the two polymers.

In addition, it is also believed that although the acid copolymer is more reactive to the base, at least some hydrolysis of the acrylate occurs and as a result, some salt formation in the ethylene-aklyl acrylate polymer should accompany the neutralization of the acid copolymer. Physical interactions between the metal carboxylate groups on both polymers provide physical crosslinks between the two materials. That, in turn, promotes compatibilization and an enhancement of the mechanical properties, i.e., golf ball properties, of the blend vis a vis an unreacted acid copolymer/ethylene acrylate blend and perhaps even a blend of preformed neutralized acid copolymer with ethylene acrylate copolymer.

With regard to neutralization of the ethylene-alkyl acrylate copolymers, it is believed to be to use neat bease in the extrusion hydrolyzation/neutralization as long as sufficient water is present. The water could is present from the natural moisture content of the resin (i.e., not well-dried) or from using a hydrated base, such as zinc acetate dihydrate. Also, if the acid copolymer is neutralized simultaneously, the water by product of the neutralization with, for example, say sodium hydroxide, will provide water—i.e., an aqueous alkaline environment, that would promote hydrolysis of the ester.

It is also possible that a dynamic vulcanization takes place where superior properties are the result of a finer phase morphology of the dispersed crosslinked phase (here, the neutralized acid copolymer) in an essentially uncrosslinked continuous matrix of ethylene acrylate ester.

The formations of Tables 26–28 above include examples of an acid copolymer reacted in the presence of maleic anhydride functional elastomers Kraton FG-1901X and Fusabond D-197. In simple blends with ionomers, this was the subject of U.S. Pat. Nos. 4,986,545 and 5,098,105, incorporated herein by reference.

A further advantage of the reactive blends of Tables 26 and 27 over the non-reactive blends of Table 25 is the improved cut resistance. While most of the blends of Table 25 give an undesirable "2" rating, nearly all of those in Tables 26 and 27 give a rating of "3", which is comparable to the current Tour balls (see, e.g. Table 29). It should be further noted that formulations 101 and 106 in Table 26 had several balls break during COR testing. The related formulations in Table 27 (formulations 109 and 114) did not have this problem. In general, although no COR advantage is observed (i.e., some COR values of Table 25 are higher and some are lower than the corresponding Table 24 formulations) the balls prepared using the formulations of Table 25 are tougher, slightly softer and more durable than those of Table 24.

Example 6

In Formulation Nos. 121–135, the effectiveness of golf ball covers produced from alkali metal cation neutralized ethylene alkyl acrylate copolymers (such as the Chevron IMAC DS resins) either alone or in blends with metal cation neutralized olefin-carboxylic acid copolymers (such as the Exxon Iotek™ resins) were evaluated. Table 30 below indicates the properties of the alkali metal cation neutralized alkyl acrylate copolymers alone and in blends with Iotek™ (polyethylene acrylic acid type) ionomer resins. Formulation No. 126 is representative of the assignee/licensee's current hard covered Top-Flite® XL golf ball. Formulation Nos. 134 and 135 represent a fairly broad range of desirable hard/soft ionomer blends.

TABLE 30

|  | 121 | 122 | 123 | 124 | 125 | 126 | 127 | 128 | 129 | 130 | 131 | 132 | 133 | 134 | 135 |
|---|---|---|---|---|---|---|---|---|---|---|---|---|---|---|---|
| DS-3054 | 100 | — | — | — | — | — | 50 | — | — | — | — | — | — | — | — |
| DS-3053 | — | 100 | — | — | — | — | — | 50 | — | — | — | 75 | 25 | — | — |
| DS-4032 | — | — | 100 | — | — | — | — | — | 50 | — | — | — | — | — | — |
| DS-3076 | — | — | — | 100 | — | — | — | — | — | 50 | — | — | — | — | — |
| Iotek ™ 7510 | — | — | — | — | 100 | — | — | — | — | — | 50 | — | — | 75 | 25 |
| Iotek ™ 7010 | — | — | — | — | — | 50 | 25 | 25 | 25 | 25 | 25 | 12.5 | 37.5 | 12.5 | 27.5 |
| Iotek ™ 8000 | — | — | — | — | — | 50 | 25 | 25 | 25 | 25 | 25 | 12.5 | 37.5 | 12.5 | 37.5 |
| Finished Balls: |  |  |  |  |  |  |  |  |  |  |  |  |  |  |  |
| Size | 1.694 | — | 1.676 | 1.676 | 1.677 | 1.681 | 1.677 | 1.678 | 1.676 | 1.677 | 4.678 | 1.680 | 1.680 | 1.678 | 1.680 |
| Weight | 44.3 | — | 44.6 | 44.6 | 44.9 | 45.0 | 44.5 | 44.6 | 44.6 | 44.7 | 44.8 | 44.5 | 44.7 | 44.9 | 44.9 |
| Comp. (Riehle) | 85 | — | 72 | 72 | 84 | 66 | 77 | 76 | 70 | 70 | 78 | 81 | 72 | 83 | 72 |
| C.O.R. | 0.7804 | — | 0.7862 | 0.7903 | 0.7833 | 0.8159 | 0.7862 | 0.788 | 0.796 | 0.7996 | 0.7908 | 0.782 | 0.7551 | 0.7837 | 0.8018 |
| Hardness/ Shore D | 34 | — | 56 | 56 | 44 | 66 | 49 | 51 | 60 | 61 | 53 | 44 | 56 | 46 | 59 |

TABLE 30-continued

|  | 121 | 122 | 123 | 124 | 125 | 126 | 127 | 128 | 129 | 130 | 131 | 132 | 133 | 134 | 135 |
|---|---|---|---|---|---|---|---|---|---|---|---|---|---|---|---|
| Cut Test/ Guillotine | 1 | — | 2 | 2–3 | 3 | 3 | 2 | 3 | 3 | 3–4 | 3 | 2 | 2 | 3 | 3–4 |

Orange SD-90 MTS Cores
Avg. Size — 1.541"
Avg. Wt. — 36.5 g
Avg. Riehle Comp. — 79
Avg. C.O.R. — 0.787
Rank of cut Test:
1 = clean cut
5 = no visible marking The data indicates that the relatively soft alkali metal cation neutralized ethylene alkyl acrylate copolymers can be utilized alone or in blends with metal cation neutralized olefin-carboxylic acid copolymers to produce suitable golf ball covers. Some improvement in durability occurs when the relatively soft alkali metal cation neutralized alkyl acrylate copolymers are blended with the hard Iotek™ resins. See Formulation Nos. 124–125 in comparison with Formulation Nos. 127–130. Accordingly, the results demonstrate that alkali metal neutralized ester-based ionomer resins based on ethylene alkyl acrylate copolymers produce effective golf ball cover compositions.

The invention has been described with reference to the preferred embodiment. Obviously, modifications and alterations will occur to others upon a reading and understanding of the preceding detailed description. It is intended that the invention be construed as including all such alterations and modifications insofar as they come within the scope of the appended claims or the equivalents thereof.

We claim:

1. A golf ball having a core and a cover wherein the cover comprises a composition including an acid copolymer including about 1% to about 30% acrylic acid, and an ethylene copolymer including up to about 30% by weight of an alkyl acrylate selected from the group consisting of methyl acrylate, butyl acrylate, and ethyl acrylate, the acid copolymer comprising about 0 to 90 parts by weight of the overall composition and the ethylene copolymer comprising 100 to 10 parts by weight of the composition, the cover further including a metal salt of a member selected from the group consisting of zinc, potassium, lithium, calcium, sodium, nickel, magnesium, and manganese.

* * * * *